United States Patent
Rembarz et al.

(10) Patent No.: US 9,414,347 B2
(45) Date of Patent: Aug. 9, 2016

(54) ADVANCED GEOCASTING METHODS IN MOBILE COMMUNICATION NETWORKS, AND NETWORK NODES THEREFOR

(71) Applicant: Telefonaktiebolaget L M Ericsson (publ), Stockholm (SE)

(72) Inventors: Rene Rembarz, Aachen (DE); Enrico Brancaccio, Milan (IT); Branko Djordjevic, Herzogenrath (DE); George Foti, Quebec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/409,932

(22) PCT Filed: Jun. 19, 2013

(86) PCT No.: PCT/EP2013/062719
§ 371 (c)(1),
(2) Date: Dec. 19, 2014

(87) PCT Pub. No.: WO2013/189974
PCT Pub. Date: Dec. 27, 2013

(65) Prior Publication Data
US 2015/0189615 A1    Jul. 2, 2015

Related U.S. Application Data

(60) Provisional application No. 61/661,414, filed on Jun. 19, 2012.

(51) Int. Cl.
*H04W 4/00* (2009.01)
*H04W 60/00* (2009.01)
(Continued)

(52) U.S. Cl.
CPC .............. *H04W 60/00* (2013.01); *H04W 4/021* (2013.01); *H04W 4/046* (2013.01); *H04W 4/20* (2013.01)

(58) Field of Classification Search
CPC ..... H04W 60/00; H04W 4/021; H04W 4/046; H04W 4/20
USPC ............................................ 455/495.1, 435.1
See application file for complete search history.

(56) References Cited

U.S. PATENT DOCUMENTS

2006/0206610 A1*  9/2006  Ling ...................... H04W 4/02
                                                                709/226

FOREIGN PATENT DOCUMENTS

EP          2 254 309 A1     11/2010
WO     WO 2006/096826 A2     9/2006
(Continued)

OTHER PUBLICATIONS

Jodlauk et al: "An Optimized Grid-Based Geocasting Method for Cellular Mobile Networks," Proc. 18$^{th}$ ITS World Congress, Orlando, Florida, Oct. 16-20, 2011, 12 pages.

(Continued)

*Primary Examiner* — Amancio Gonzalez
(74) *Attorney, Agent, or Firm* — Myers Bigel & Sibley, P.A.

(57) ABSTRACT

A method provides a network service in a communication network covering a geographical area for a plurality of mobile clients. A mobile client (among the plurality of mobile clients) registers with the communication network. A geomessaging register identifies a service enabler based on registration information of the mobile client. The geomessaging register sends, to the identified service enabler, contact information of the mobile client. The service enabler sends, to the geomessaging register, contact information of the service enabler. The geomessaging register then sends, to the mobile client, the contact information of the service enabler. The mobile client is then connected to the service enabler for receiving the network service. Related network nodes participate in providing such services.

10 Claims, 19 Drawing Sheets

(51) Int. Cl.
*H04W 4/02* (2009.01)
*H04W 4/04* (2009.01)
*H04W 4/20* (2009.01)

(56) References Cited

FOREIGN PATENT DOCUMENTS

| WO | WO 2012/055433 A1 | 5/2012 |
|---|---|---|
| WO | WO 2012/072407 A1 | 6/2012 |
| WO | WO 2013/171701 A1 | 11/2013 |

OTHER PUBLICATIONS

Draft ETSI TR 102 962 V<0.0.5> (Dec. 2011) "Intelligent Transport Systems; Framework for Public Mobile Networks in Cooperative ITS (C-ITS)", ETSI Draft; WG20035V005, European Telecommunications Standards Institute (ETSI), 650, Route Des Lucioles, F-06921 Sophia-Antipolis; France; No. V0.0.5, Dec. 22, 2011, XP014073122A, 66 pages.

TS 103 084 V<0.0.0> (<Mar. 2012>) "Geomessaging Enabler", ETSI Draft; ITSWG3 (12) 000021_INITIAL_DRAFT_TS103_084_GEOMESSAGING_ENABLER_WG1_W1, European Telecommunications Standards Institute (ETSI), 650, Route Des Lucioles, F-06921 Sophia-Antipolis; France; No. V0.0.0, Apr. 16, 2012, XP014073196A, 21 pages.

TS 103 084 V<0.0.2> (<Jun. 2012>) "Geomessaging Enabler", ETSI Draft; WG10025V002, European Telecommunications Standards Institute (ETSI), 650, Route Des Lucioles, F-06921 Sophia-Antipolis; France; No. V0.0.2, Jun. 20, 2012, XP014073029A, 35 pages.

International Search Report for International Application No. PCT/EP2013/062719 mailed Feb. 13, 2014, 8 pages.

Written Opinion of the International Searching Authority for International Application No. PCT/EP2013/062719 mailed Feb. 13, 2014, 10 pages.

International Preliminary Report on Patentability for International Application No. PCT/EP2013/062719 mailed Oct. 30, 2014, 20 pages.

ETSI TR 102 962 V1.1.1 (Feb. 2012) "Intelligent Transport Systems (ITS); Framework for Public Mobile Networks in Cooperative ITS (C-ITS)", Technical Report, European Telecommunications Standards Institute (ETSI), 650, Route Des Lucioles, F-06921 Sophia-Antipolis; France; vol. ITS WG2, No. V1.1.1, Feb. 1, 2012, XP014069748, 63 pages.

Yucel et al: "Event Aggregation and Distribution in Web-based Management Systems", Integrated Network Management, 1999. Distributed Management for the NE Tworked Millennium, May 24, 1999, XP010336992; pp. 35-48.

\* cited by examiner

ADVANCED GEOCASTING METHODS IN MOBILE COMMUNICATION NETWORKS, AND NETWORK NODES THEREFOR

CROSS REFERENCE TO RELATED APPLICATION

This application is a 35 U.S.C, §371 national stage application of PCT International Application No. PCT/EP2013/062719, filed on 19 Jun. 2013, which itself claims the benefit of U.S. Provisional Patent Application No. 61/661,414, filed 19 Jun. 2012, the disclosures and contents of both of which are incorporated by reference herein in their entirety. The above-referenced PCT International Application was published in the English language as International Publication No. WO 2013/189974 A2 on 27 Dec. 2013.

TECHNICAL FIELD

The present invention relates to methods carried out in a telecommunication network, for providing a network service (or network services) to a plurality of mobile clients. The invention also relates to network nodes in a telecommunication network, for participating in providing such network service(s).

BACKGROUND

Geomessaging, also referred to as geocasting, has been developed to enable the distribution of messages to a designated geographic area. In cases in which a network service includes a localized information service, a so-called geomessaging function can be introduced into the mobile communication network. On one side, this geomessaging function maintains some relationship to all mobile terminals (clients) and their geographical location. On the other side, it exposes an interface to a multitude of services (network internal and external), which allows sending messages into a spatial area without knowing individual client's locations. For this purpose, a geomessaging server component tracks the position of its client using an optimized, grid-based scheme. The geographical area that is covered by the cellular communications network is mapped by a grid with grid lines and grid fields. The grid may comprise several grid spacings. Clients notify the geomessaging server when they move to another area of the grid. Based on this mapping of clients to grid areas stored on the geomessaging server, the geomessaging server can serve distribution requests by different application servers and forward messages in nearly real-time to clients in a geographic area as specified by the application server. A high level architecture is schematically illustrated by FIG. 1, wherein AS1 and AS2 are two application servers and GM is a geomessaging server.

G. Jodlauk, R. Rembarz, Z. Xu, "*An Optimized Grid-Based Geocasting Method for Cellular Mobile Networks*," Proc. 18th ITS World Congress, Orlando, Fla., USA, Oct. 16-20, 2011, pp. 1463ff, relates to a geocast scheme based on a grid-based localization. In this approach, a grid is defined as an area covering the entire served geocast region. The grid subdivides the served geocast area into tiles. Clients only report their location to the geocast server when they move from one tile to another. As long as a client remains in its tile, it stays silent. The individual clients only have the knowledge of the tile they are currently in. The client-side geocast application used the positioning system (e.g. GPS) to regularly check whether it moves out of the current tile. When it crosses the border of the tile, it contacts the server and uploads new geographic coordinates. In response to this update, the server updates its per-tile client list and sends the boundaries of the new tile back to the client. The client can then stay silent again until it reaches the boundaries of the new tile, and the procedure starts over.

International application WO 2012/055433 A1 relates to similar methods and systems for providing a network service in a cellular communication network.

It is desirable to improve the methods and architectures of the prior art, notably as far as providing efficient implementation solutions is concerned.

SUMMARY

To meet or at least partially meet the above-mentioned goal, methods and network nodes according to the invention are defined in the independent claims. Particular embodiments are defined in the dependent claims.

In one embodiment, a method aims at providing a network service in a communication network covering a geographical area for a plurality of mobile clients. In the method, a mobile client (among the plurality of mobile clients) registers with the communication network. A register, hereinafter referred to as "geomessaging register", identifies a service enabler based on registration information of said mobile client. The geomessaging register sends, to the identified service enabler, contact information of said mobile client. The service enabler sends, to the geomessaging register, contact information of the service enabler. The geomessaging register sends, to the mobile client, said contact information of the service enabler. Finally, the mobile client is connected to the service enabler for receiving the network service.

In one embodiment, a network node, hereinafter referred to as "geomessaging register", participates in providing a network service in a communication network covering a geographical area for a plurality of mobile clients. The geomessaging register is configured for (i) identifying a service enabler based on a registration information of a mobile client, the mobile client being one of the plurality of mobile clients and the registration information being registration information regarding the registration of the mobile client to the communication network; (ii) sending, to the identified service enabler, a contact information of said mobile client; (iii) receiving, from the service enabler, a contact information of the service enabler; and (iv) sending, to the mobile client, said contact information of the service enabler.

In one embodiment, a network node, hereinafter referred to as "service enabler", participates in providing a network service in a communication network covering a geographical area for a plurality of mobile clients. The service enabler is configured for (i) receiving, from a register, hereinafter referred to as "geomessaging register", a contact information of a mobile client, the mobile client being one of the plurality of mobile clients; (ii) sending, to the geomessaging register, a contact information of the service enabler; and (iii) participating in connecting the mobile client to the service enabler for receiving the network service.

In one embodiment, a network node, hereinafter referred to as "proxy enabler", participates in providing a network service in a communication network covering a geographical area for a plurality of mobile clients. The proxy enabler is configured for (i) receiving, by an application server, a request specifying a distribution target area; (ii) querying a network node, hereinafter referred to as "geomessaging register", for obtaining information about an appropriate service enabler for handling a request associated with the specified distribution target area; and (iii) communicating with the appropriate service enabler in order for the received request to be handled by said appropriate service enabler.

The invention also relates to mobile terminals (acting as mobile clients) configured to be used in the above-described method, and to computer programs comprising computer-readable instructions configured, when executed on a computer (such as a network node as described above, or a mobile terminal as described above), to cause the above-described method to be carried out. The invention also relates to computer program products comprising computer programs as mentioned above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. It will notably be shown how the methods and architectures of the prior art are improved by embodiments of the invention, notably as far as scalability, redundancy, and integration with infrastructures providing call and session control are concerned. A list of abbreviations and their meaning is provided at the end of the detailed description.

Figure 1:
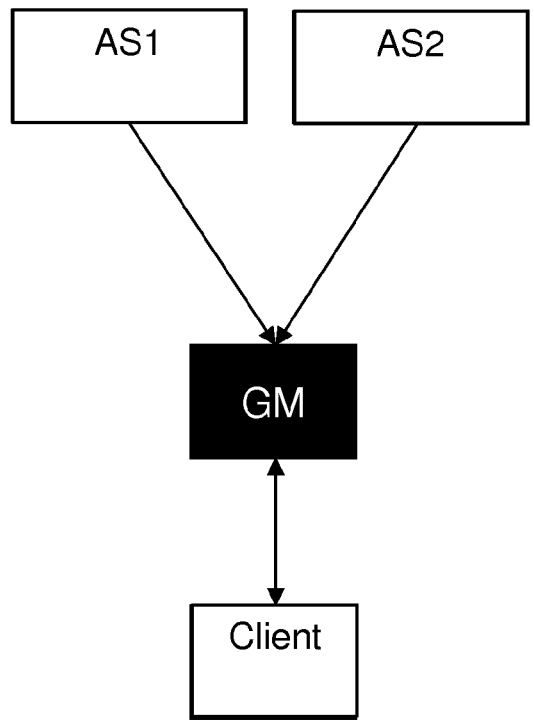
FIG. 1 schematically illustrates a prior art network architecture comprising a monolithic geomessaging enabler.

The capability to address clients in a designated area, i.e. geomessaging, has gained importance in the ongoing standardization activities of ETSI TC ITS (where ITS stands for intelligent transport systems), which is in the process of standardizing a system for car-to-car (C2C) and car-to-infrastructure (C2I) communication, jointly called car-to-X or C2X. The prior art assumes a monolithic geomessaging enabler, as illustrated by FIG. 1.

The inventors have recognized that, in a practical, nation-wide or multi-national deployment, a typical deployment may require a number of instances of the geomessaging enabler, both for scalability and redundancy reasons. Some embodiments of the invention address that goal, i.e. the goal of improving scalability and redundancy.

Further, the inventors have also recognized that geomessaging was originally designed as providing a technology-agnostic geomessaging enabler. The prior art therefore does not provide any procedures to integrate geomessaging into the signaling mechanisms of an advanced telecommunication network, specifically those where call and session control is based on the 3GPP IP Multimedia Subsystem (IMS). Some embodiments of the invention address that goal, i.e. the goal of improving the integration with infrastructures providing, notably, call and session control.

Although some embodiments of the invention are specifically geared towards the usage in a cooperative ITS (C-ITS) environment, the invention is applicable in many other areas as well.

Figure 2:
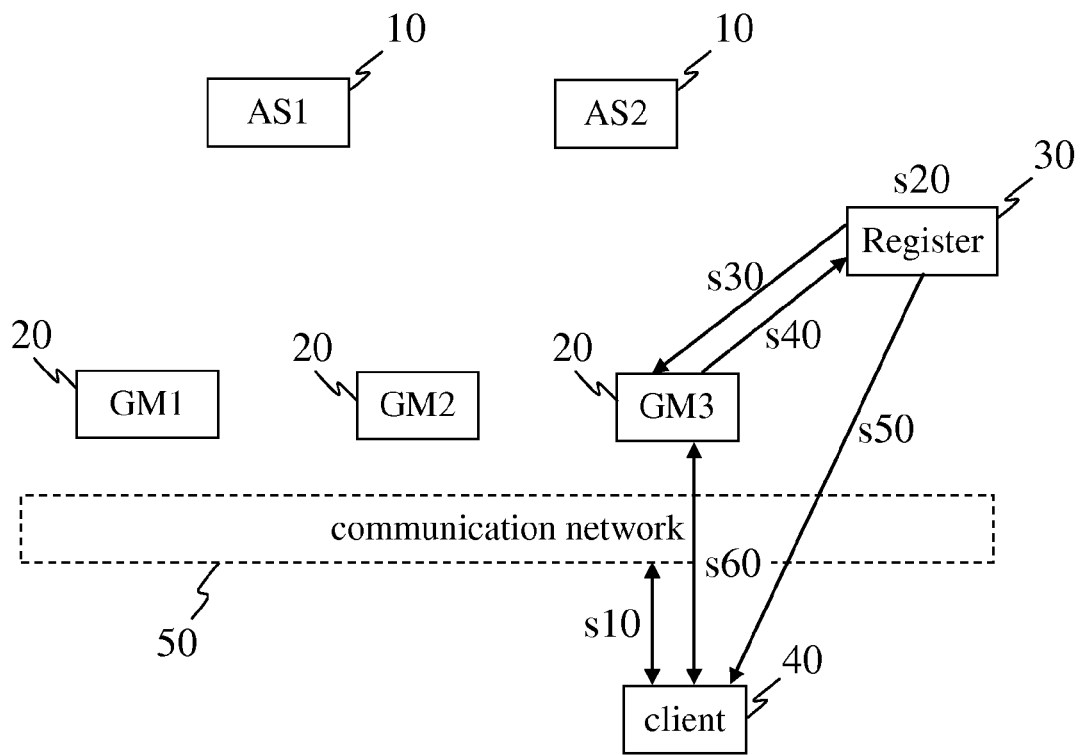
FIG. 2 schematically illustrates a network architecture and method aiming at providing a network service in a communication network covering a geographical area for a plurality of mobile clients, in one embodiment of the invention.

In one embodiment, as schematically illustrated by FIG. 2, a method aims at providing a network service (such as for example a localized information service), or network services, in a communication network 50 (such as for example a cellular network) covering a geographical area for a plurality of mobile clients 40. For the sake of simplicity, only one mobile client 40 is illustrated on FIG. 2. However, more than one mobile client 40 may be present. In the method, a mobile client 40 is registered s10 to the communication network. A service enabler 20 (labeled "GM3" on FIG. 2) is identified s20 by a register 30 (or "geomessaging register") based on registration information of the mobile client 40. Then, the geomessaging register 30 sends s30 contact information of the mobile client 40 to service enabler 20 and service enabler 20 sends s40 its contact information to geomessaging register 30. Geomessaging register 30 sends s50 this contact information to mobile client 40 and finally mobile client 40 connects s10 to service enabler 20 in order to receive the network service.

In one embodiment, the above-described method further comprises the steps of (i) notifying a server, such as for example a presence server or more specifically an IMS presence server, of a location of mobile client 40 and identification information about the geomessaging register 30 associated with said mobile client registration; (ii) subscribing of said geomessaging register 30 to the server; and (iii) notifying said geomessaging register 30 by the server about said mobile client location.

In one embodiment, any one of the above-described methods further comprises the step of providing, by the service enabler 20 to the mobile client 40, at least one grid tile of a grid covering at least part of the geographical area with grid fields. The grid may be framed by grid lines and is spaced by grid spacing.

The service enabler 20 may be, in one embodiment, a network node (i) maintaining relationships between the plurality of mobile clients 40 and their geographical location; and (ii) exposing an interface for offering a plurality of services to application servers 10.

Figure 3:
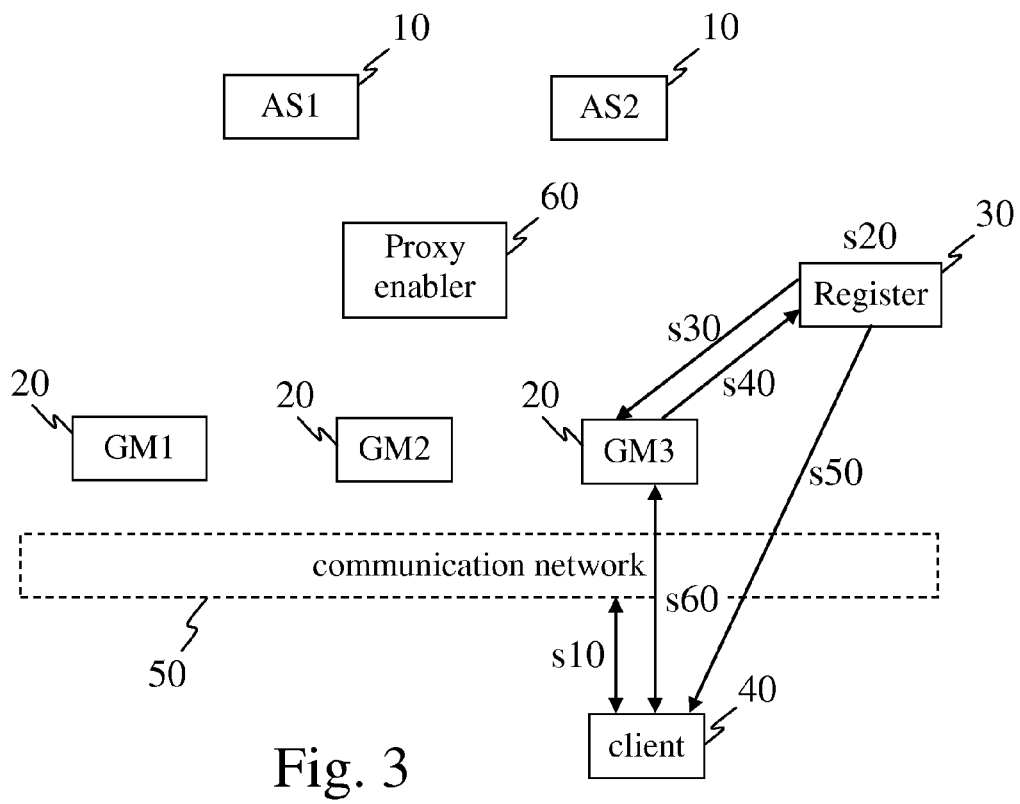
FIG. 3 schematically illustrates a network architecture, in one embodiment of the invention, which differs from the architecture of FIG. 2 in that a proxy enabler is further provided.

In one embodiment, a proxy enabler 60 is additionally provided, as schematically illustrated on FIG. 3. Proxy enabler 60 provides a single point of contact towards the application servers 10 so that the application servers 10 do not have to select the appropriate service enabler 20 on their own. Embodiments of a proxy enabler 60 will be further discussed below.

Figure 4:
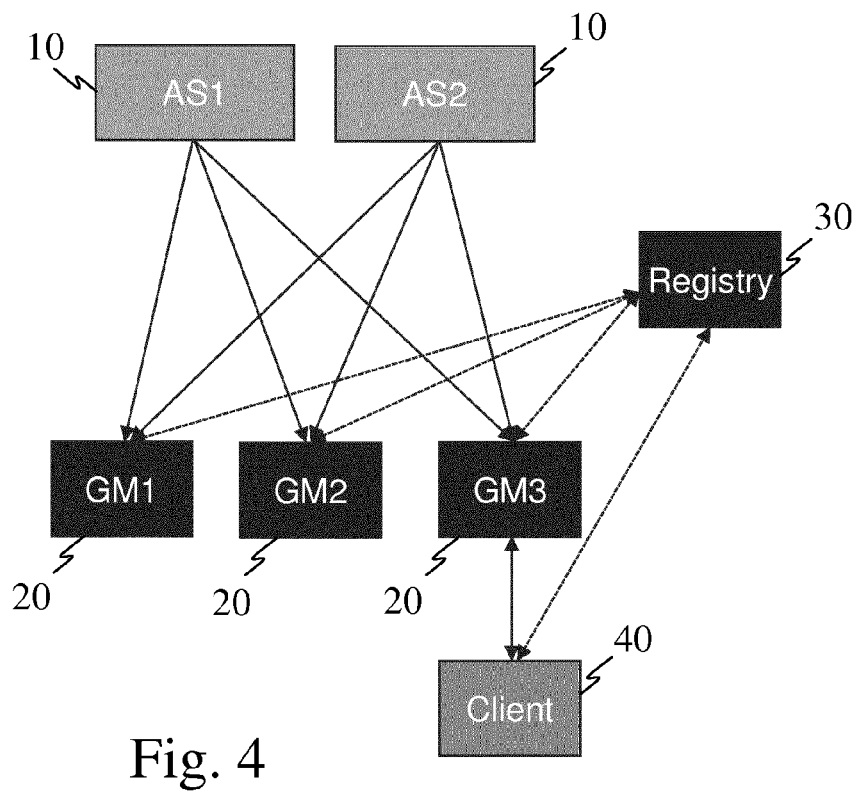
FIG. 4 schematically illustrates a network architecture involving a plurality of service enablers and a geomessaging register, in one embodiment of the invention.

Let us now discuss in more detail, with reference to FIG. 4, embodiments involving a multi-enabler support (i.e., support for multiple service enablers 20) and a geomessaging register 30. In order to enable the seamless operation of a plurality of service enablers 20 (also sometimes called "geomessaging enablers" hereinafter), a new entity is introduced which is called geomessaging register 30.

The geomessaging register 30, which may also be referred to simply as a register, is capable of handling geomessaging location updates coming from a mobile client 40. Geomessaging register 30 keeps track of the geographical areas covered by the different service enablers 20 (labeled "GM1", "GM2", "GM3" on FIG. 4) and distributes, i.e. assigns, the mobile client 40 to an appropriate service enabler 20. In case of a geomessaging location change, geomessaging register 30 is capable of initiating a hand-over between service enablers 20. In an embodiment where IMS is used, there may be intermediary nodes between the user (mobile client 40) and the geomessaging register 30, such as IMS gateways or IMS core network nodes.

The geomessaging register 30 may subscribe to a presence server to get a notification of all changes to the service enabler's 20 assignments (i.e., assignments of mobile clients 40 to service enablers 20).

Figure 5:
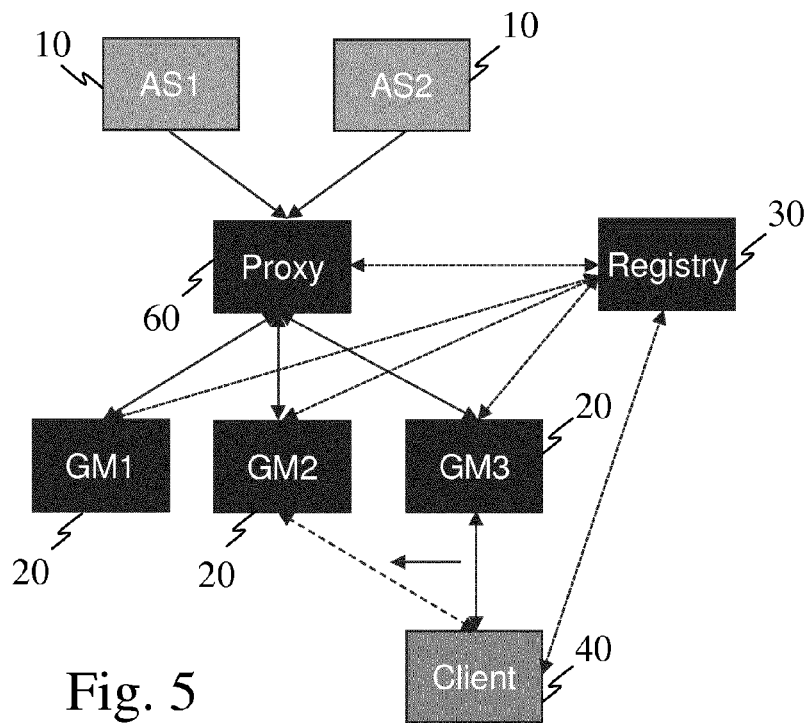
FIG. 5 schematically illustrates a network architecture, in one embodiment of the invention, which differs from the architecture of FIG. 4 in that a proxy enabler is further involved.

Let us now discuss, with reference to FIG. 5, embodiments involving a proxy enabler 60. In order to relieve the application servers 10 from selecting an appropriate service enabler 20 by themselves, e.g. based on preconfigured information, a proxy enabler 60 is introduced that acts as a single point of contact towards the applications servers 10.

To the application servers 10, proxy enabler 60 appears as a monolithic service enabler 20 and exposes the same interface as a regular service enabler 20. Proxy enabler 60 has an interface towards geomessaging register 30 that enables proxy enabler 60 to dynamically select an appropriate service enabler 20. The selection is made based on the distribution target area specified by the application server (AS) 10 when making its request.

The information exchange between proxy enabler 60 and geomessaging register 30 can be realized according to different embodiments, for example as follows:

1.) Proxy enabler 60 may make a request for handling by a service enabler 20 following a request it receives from an AS 10. Optionally, proxy enabler 60 may cache the replies in order to enable faster responses to subsequent requests.
2.) Proxy enabler 60 may subscribe to the geomessaging register 30 to get a notification of all changes to the service enabler's 20 assignments (e.g., changes to the assignments of service enablers 20 to geographical areas). Such a subscription is realized, in some embodiments, using a publish/subscribe scheme or using database replication technology.

Service enabler 20 enables, in some embodiments, the use of cellular networks for information dissemination in C-ITS. For road safety applications for example, service enabler 20 is responsible for distribution of e.g. CAM, DENM, and SPAT messages.

To that effect, service enabler 20 performs, in some embodiments, the following functions:
  Maintaining a list of the target areas (service distribution areas defined by C-ITS application servers 10) and distribution areas (areas defined by tiles and their coordinates, which correspond to target area).
  Maintaining a list of the identities of mobile clients 40 (such as mobile ITS stations 40) inside any geographical area. This requires that mobile clients 40, e.g. vehicles, update the service enabler 20 any time they leave their current geographical area and enter into a new area. This, in turn requires that these mobile clients 40 be updated with the coordinates of their current geographical area so that they can send the location update message once they leave that area.
  Disseminating, based on the above-mentioned processes (also referred to as grid management), and upon initiation from an application server 10, geocasted messages from the application server 10 to concerned mobile clients 40 in accordance with the locations requested by the application server 10.

In one embodiment, the size of the distribution area of a geocasted message, such as for example a Cellular Hazard Warning (CHW) message, may be adapted to the message type, the road traffic density, etc. Further, in one embodiment, the road topology may be taken into account to optimize the distribution area layout. For example, the regions may follow the run of major roads. Different distribution areas may also exist for different types of messages.

Figure 6:
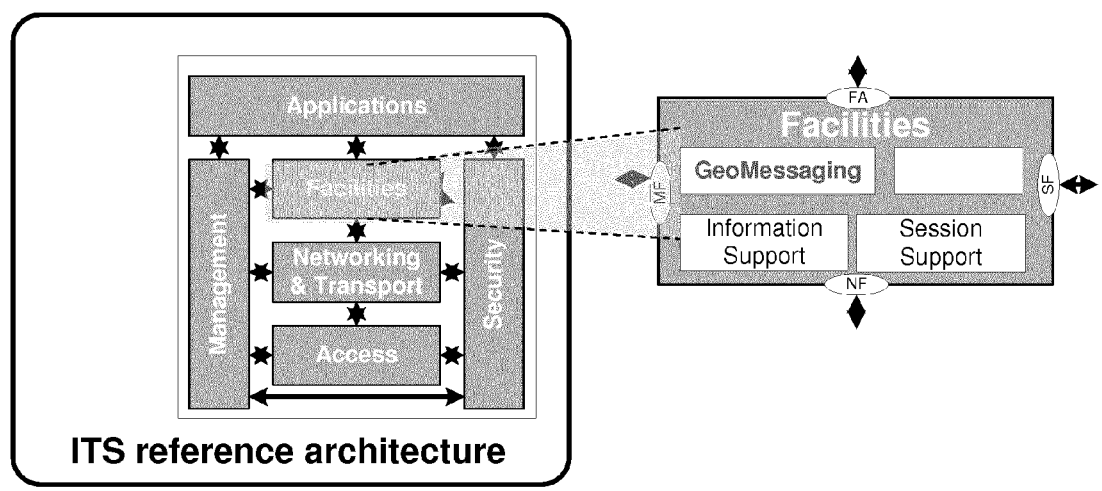
FIG. 6 schematically illustrates an intelligent transport system (ITS) architecture in which geomessaging is a functionality in a facilities layer of the ITS, in one embodiment of the invention.

Let us now discuss in more detail, with reference to FIGS. 6 to 9, some architectural aspects of an infrastructure used in some embodiments of the invention. In particular, geomessaging may be, as schematically illustrated by FIG. 6, a new functionality in a facilities layer as defined in ETSI EN 302 665 V1.1.1 (2010 September), "Intelligent Transport Systems (ITS); Communications Architecture" (on FIG. 6, "FA" is the name of the interface between the facilities layer and the ITS-S applications; "SF" is the name of the interface between the security entity and the facilities layer; "NF" is the name of the interface between the networking & transport layer and the facilities layer; and "MF" is the name of the interface between the management entity and the facilities layer).

In that context, two new functional elements may be introduced, according to their role played in ITS subsystem. These elements are the service enabler 20, also referred to as "geomessaging enabler" (as part of ITS Central Station), and the "geomessaging client" (as part of Personal or Vehicle ITS subsystem) hosted on a mobile client 40. A geomessaging network architecture is accordingly schematically illustrated by FIG. 7.

Figure 7:
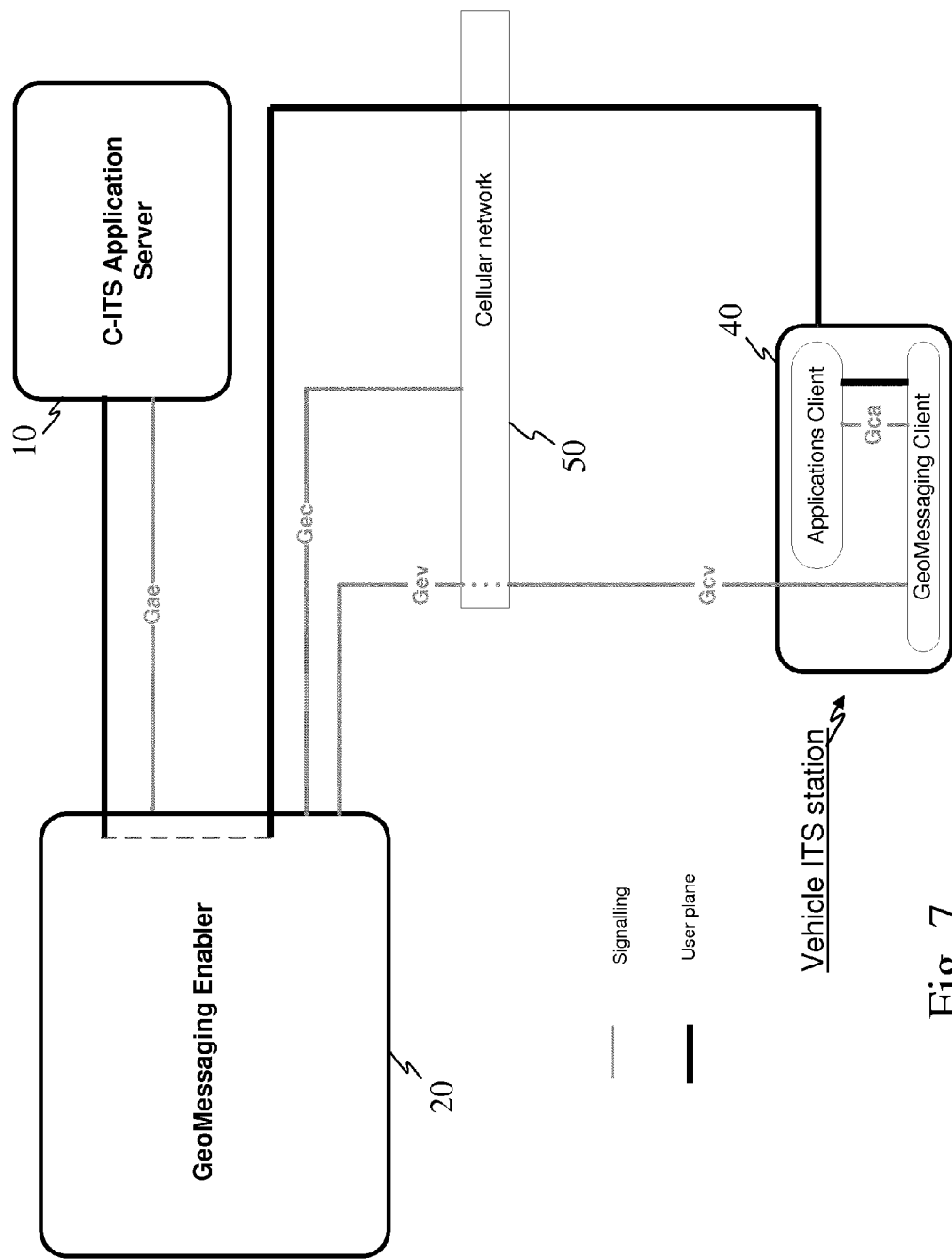
FIG. 7 schematically illustrates a geomessaging network architecture, in one embodiment of the invention.

FIG. 7 depicts both signaling and user-plane communication between a mobile client 40 (which includes both a geomessaging client and an applications client), a service enabler 20 (geomessaging enabler) and a C-ITS application server 10, via a cellular network 50, in one embodiment of the invention.

The network elements schematically illustrated on FIG. 7 will now be discussed:

(1) C-ITS Application Server (C-ITS AS)

Figure 8:
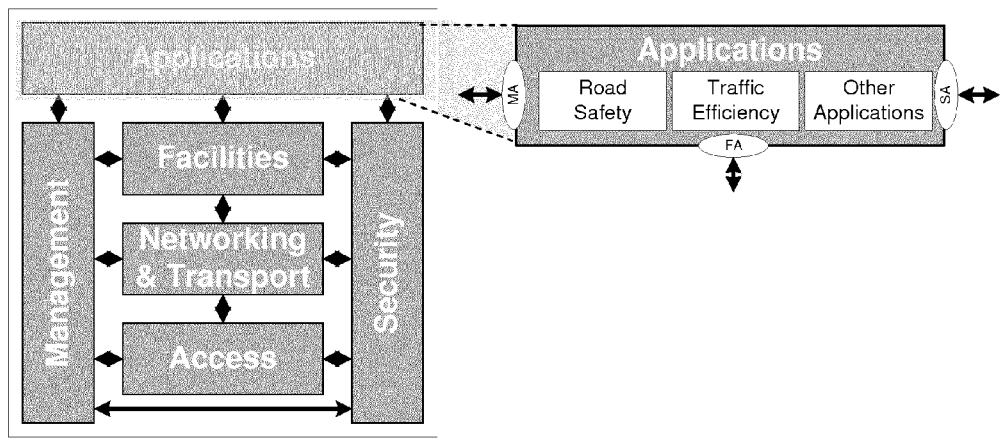
FIG. 8 schematically illustrates functions of a C-ITS application server (C-ITS AS), in one embodiment of the invention.

An ITS application is an association of two or more complementary ITS-S applications, e.g. server part and client part. ITS-S applications belong to the block "Applications" of the ITS station reference architecture illustrated in FIG. 6. The server part resides in a C-ITS application server (C-ITS AS) 10 (the functions of which are schematically illustrated by FIG. 8), while client applications part resides in the block "Applications Client" of the Vehicle ITS station 40 (on FIG. 8, "SA" is the name of the interface between the security entity and the ITS-S applications; "FA" is the name of the interface between the facilities layer and the ITS-S applications; and "MA" is the name of interface between the management entity and the ITS-S applications).

The C-ITS application server 10 aggregates inputs received from several sources including vehicles on the road, road side units, as well as external information. All these inputs are then consolidated allowing the C-ITS AS 10 to correlate incidents based on time, location and type of warning, so that it can derive a holistic picture of the road traffic with a higher level of information. An example may be a massive freeway pileup, where several different incident warnings arrive from nearly the same location and time. Based on the type of warnings, an intelligent reasoning process may be able to classify all warnings as a single consolidated event.

Finally, once the consolidation process is completed, the C-ITS AS 10 decides on the information that has to be disseminated and the target geographical area for the information. In the event that the incident and subsequently the information to be disseminated are considered relevant for a larger geographical area, the information is repackaged and sent to all users 10 in the larger area. Information dissemination is accomplished using the service enabler 20.

(2) Service enabler also referred to as geomessaging enabler)

Service enabler 20 supports two different addressing schemes for distribution purposes: unicast and broadcast.

In case of unicast distribution, each vehicle (i.e., mobile client 40) within a specific geographical area receives the geocast message (such as for example a CHW message) through an individual communication channel. In case of broadcast distribution, all vehicles (i.e., all mobile clients 40) belonging to a broadcast area are addressed collectively, rather than individually. Hence, transmission using broadcast channels is more efficient for a large number of recipients. For both distribution schemes, the vehicle system (such as for example software running on the mobile client's 40 vehicle) has to select only relevant warnings that will be indicated to the driver. This filter process interprets the location, time stamp and heading field of the received message.

In addition to disseminating messages to vehicles (i.e., mobile clients' 40 vehicles), service enabler 20 is also responsible to send, to the C-ITS AS 10, C-ITS application data which the service enabler 20 receives from ITS stations, e.g. vehicular or roadside ITS stations. This implies that C-ITS application data are first intercepted by the service enabler 20 before they are re-targeted to the C-ITS AS 10. In that capacity, service enabler 20 acts as a proxy for incoming C-ITS application data.

(3) Mobile client (including a geomessaging client function)

The mobile client 40 is responsible for the communication between an ITS station (ITS-S) and service enabler 20. This applies to incoming and outgoing communication. A mobile client 40 in an ITS-S may serve a plurality of C-ITS applications. At initialization, mobile client 40 may establish a session with service enabler 20 prior to exchanging any C-ITS application related data with the network. Following the successful establishment of a session, if a session is deployed, C-ITS application data can be sent to the network via mobile client 40. As previously stated, C-ITS application data are sent to service enabler 20 before being forwarded to the C-ITS AS 10.

(4) Cellular network

Cellular network 50 incorporates the core and radio access networks. The cellular network nodes are used for routing of signaling traffic and C-ITS application traffic between vehicular ITS stations and the network nodes such as service enabler 20 and C-ITS AS 10. The core network may also host an IP Multimedia Subsystem (IMS) infrastructure, which may be based on the Session Initialization Protocol (SIP) and includes a number of features and functionalities which may be are relevant for geomessaging communication, such as for example:

IMS presence service extensions, in order to detect user's context related to the vehicle state.

Device and vehicle mobility, and access network selection.

Automotive/telematics service creation and provisioning.

Authentication, Authorization and Accounting (AAA) for automotive services and charging.

Service control,

Security and privacy.

IMS emergency sessions.

The access technology of intended radio network may be based on existing commercial available network technologies supporting wide area coverage, e.g., GPRS, W-CDMA HSPA, WiMax and LTE.

The network elements described herein may be implemented with at least one processor coupled to a non-transitory computer-readable storage medium. The non-transitory computer-readable storage medium further includes computer-readable instructions, when executed by the at least one processor, implements the methods described herein. These methods include, but are not limited to, the methods described in conjunction with FIGS. 12 to 21. An example of network element implementation will be discussed with reference to FIG. 22.

Reference points may therefore be defined, in some embodiments of the invention, as follows (as schematically illustrated on FIG. 7). These signaling interfaces in a service enabler environment may be as follows:

"Gae" reference point: C-ITS application server 10 may use this reference point to initiate the sending of geocast messages to service enabler 20 for dissemination to specific locations. This reference point may also be used to receive messages forwarded by service enabler 20 and targeted to application server 10.

"Gec" reference point: If IMS services are used, service enabler 20 and cellular network 50 may use this reference point for accessing cellular network session management features.

"Gev" reference point: This interface may be used for grid management signaling between service enabler 20 and Vehicle ITS station 40.

"Gcv" reference point: This reference point may be used to exchange signaling and application data information between mobile client 40 and cellular network 50.

"Gca" reference point: This reference may be used internally within the Vehicle ITS stations 40, for receiving/sending of messages.

Figure 9:
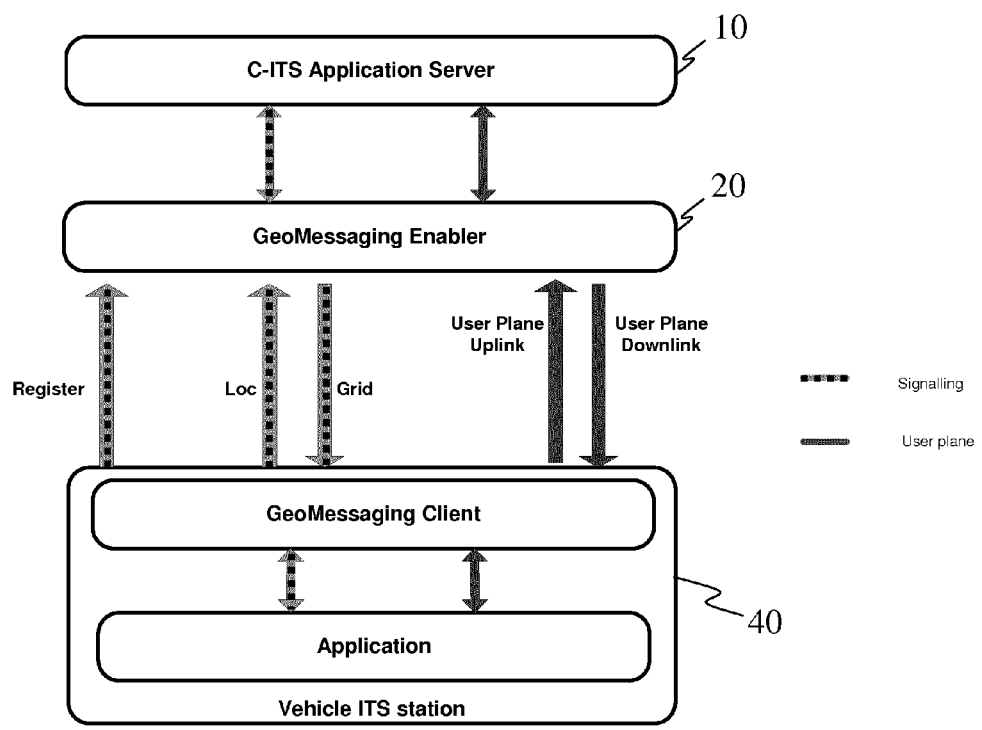
FIG. 9 schematically illustrates some geomessaging interworking scenarios in one embodiment of the invention.

FIG. 9 schematically illustrates some geomessaging interworking scenarios in one embodiment of the invention.

Service enabler 20 (labeled as "GeoMessaging Enabler" on FIG. 9) and C-ITS application server 10 may exchange both signaling and user-plane messages.

Service enabler 20 and mobile client 40 (labeled as "Geomessaging Client" on FIG. 9) may exchange:

Signaling messages:
"Register" messages (for initial registration);
"Loc" messages (the vehicle C-ITS station 40 sends its GPS position to service enabler 20);
"Grid" messages (service enabler 20 sends grid coordinates to the vehicle C-ITS station 40)

User-plane messages:
Uplink user-plane messages;
Downlink user-plane messages

Within a vehicle C-ITS station 40, the geomessaging client may transparently send user-plane traffic to applications.

Figure 10:
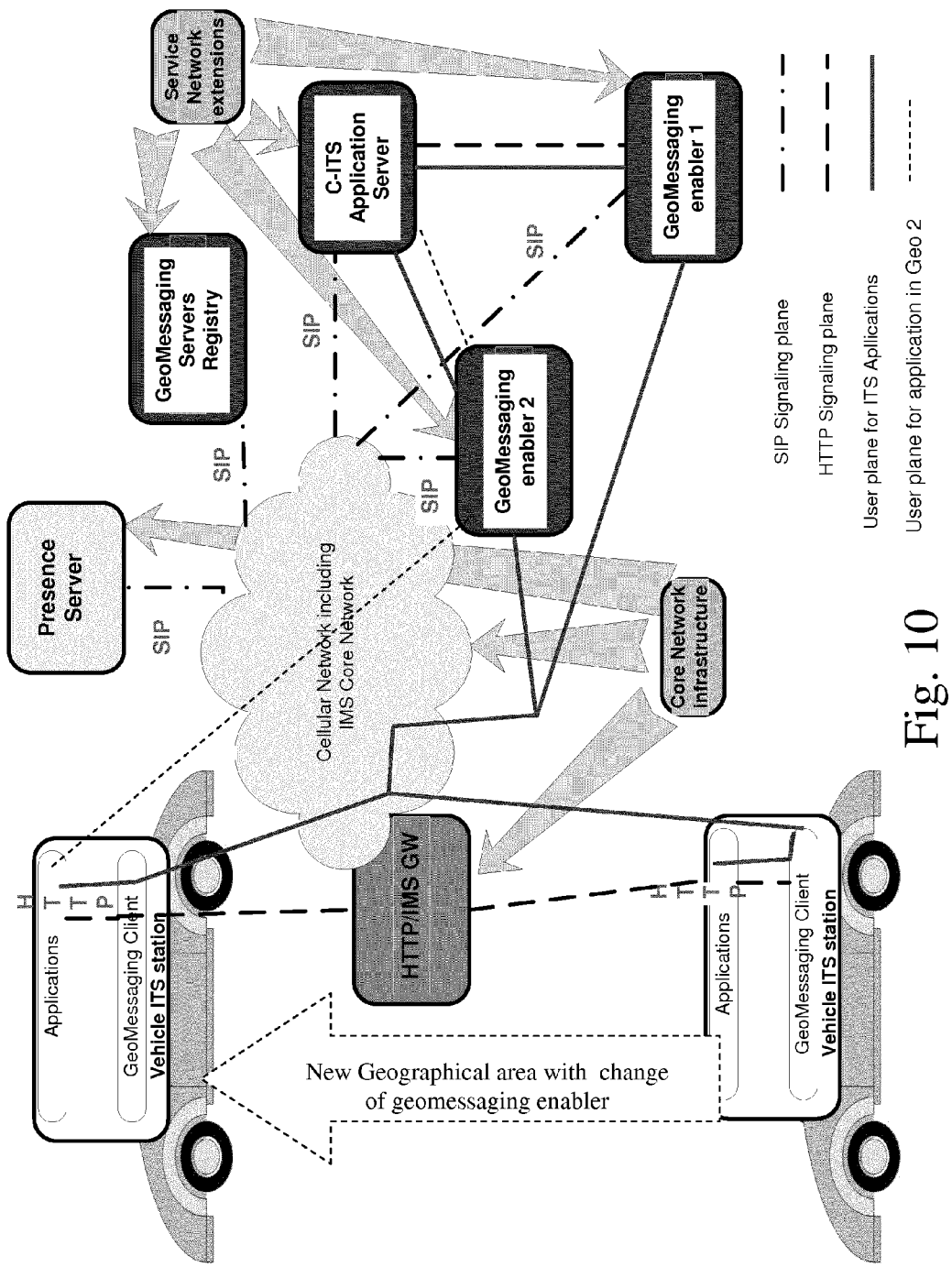
FIG. 10 schematically illustrates a network architecture and some steps that may be carried out in the context of an IMS scenario, in one embodiment of the invention.
Figure 11:
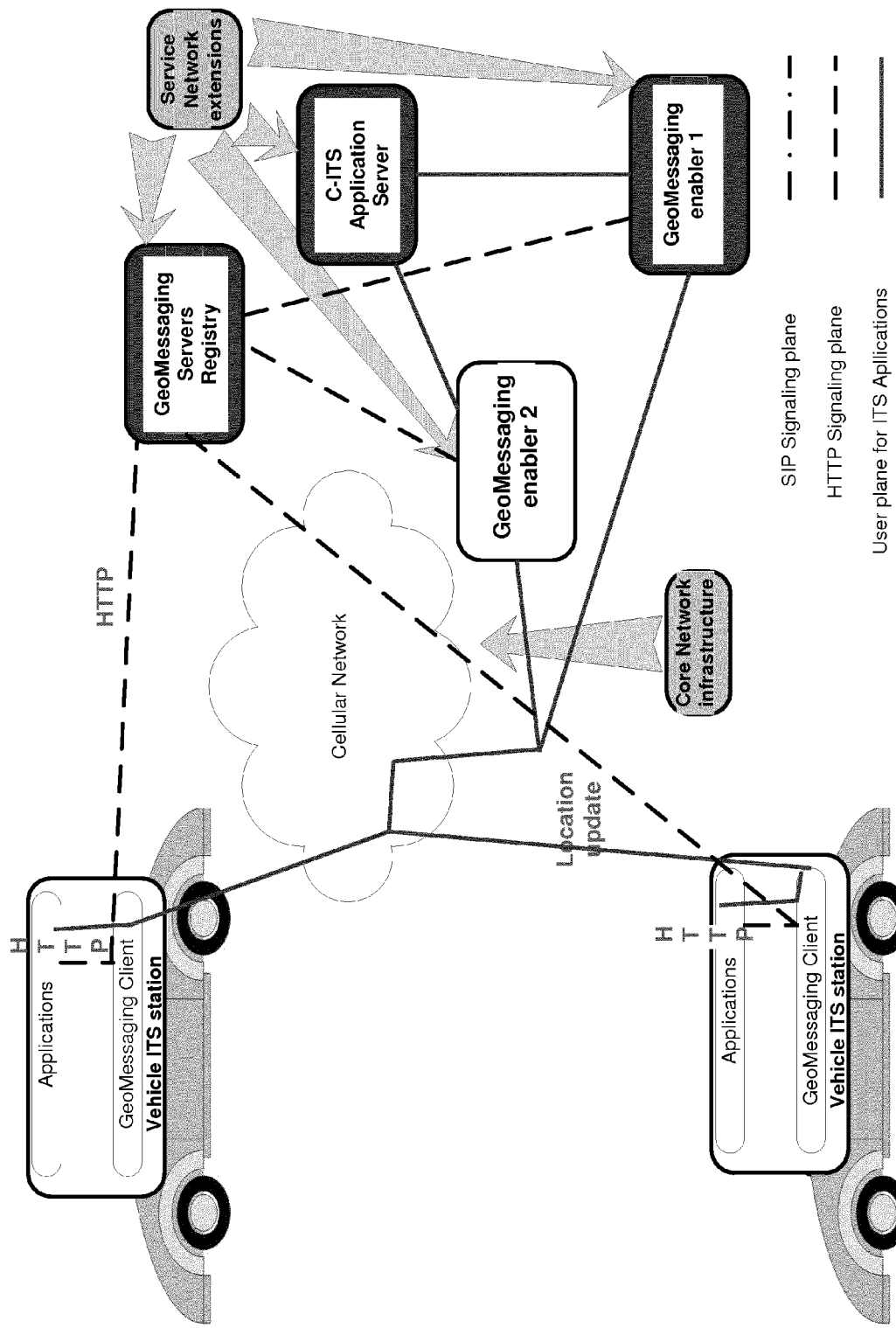
FIG. 11 schematically illustrates a network architecture and some steps that may be carried out in the non-IMS context, in one embodiment of the invention.

Let us now discuss, with reference to FIGS. 10 to 21, operations within a network as well as some associated processes in some embodiments of the invention. FIGS. 10 and 11 schematically illustrate the functional blocks that may be involved in an IMS scenario (FIG. 10) and in a non-IMS scenario (FIG. 11).

Figure 12:
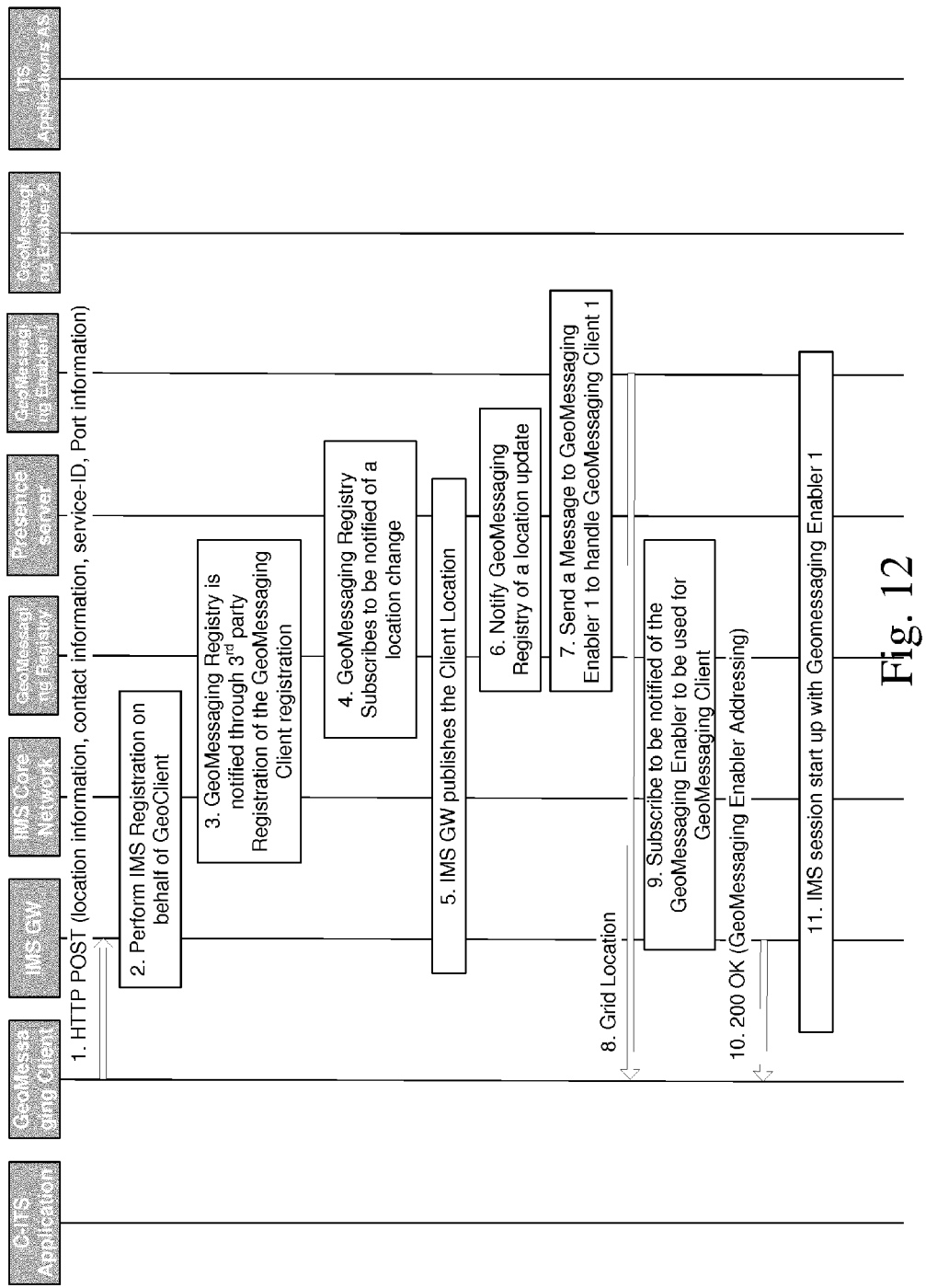
FIG. 12 is a message sequence chart of high-level signaling of a power start-up in an IMS context, in one embodiment of the invention.

FIG. 12 is a message sequence chart of high-level signaling of an IMS power start-up in one embodiment of the invention. The exchanges of messages illustrated in FIG. 12 occur at power up of an intelligent transport system (ITS) involving with a mobile client, also referred to as geomessaging client or geoclient (although in fact the geomessaging client may be viewed as one of the function of the mobile client).

1) At power-up, mobile client (geomessaging client) registers with the core network by sending an HTTP POST request to an IMS GW. Information in the message may comprise location information (i.e. geographical coordinates), contact information e.g. for the ITS (IP address or domain information), service ID (used by the service enabler to select the intended AS bound to the Service ID) and its port information (to be used by service enabler for downlink communication with applications).

2) The IMS GW performs IMS registration with IMS core network on behalf of the mobile client (geomessaging client).

3) Upon successful registration, the geomessaging register is notified by IMS core network of the mobile client (geomessaging client) registration through a third party SIP register message (a third party allows one entity to set up and manage a communication relationship between two or more other parties) and using existing 3GPP procedures, such as for example the procedures disclosed in 3GPP TS 24.229 V11.7.0 (2013 March), "*3rd Generation Partnership Project; Technical Specification Group Core Network and Terminals; IP multimedia call control protocol based on Session Initiation Protocol (SIP) and Session Description Protocol (SDP); Stage 3 (Release 11)*", sub-clause 5.4.1.7, in that regard.

4) The geomessaging register sends a SIP subscription to the presence server, which can also be referred to simply as server, to be notified of any changes in the location of the mobile client (geomessaging client). For more information about IMS presence servers, see for example 3GPP TS 23.141 V11.0.0 (2012 September), "*3rd Generation Partnership Project; Technical Specification Group Services and System Aspects; Presence Service; Architecture and functional description (Release 11)*", subclause 5.1.

5) The IMS gateway publishes to the presence server the mobile client (geomessaging client) location, which was received in step 1.

6) The presence server notifies the geomessaging register about the mobile client (geomessaging client) location.

7) After consulting its internal information, the geomessaging register locates the service enabler, which is "geomessaging enabler 1" in this case, responsible for the received location, and it then sends a SIP MESSAGE to geomessaging enabler 1 (a service enabler) to handle mobile client (geomessaging client), and it includes the contact information for the mobile client (geomessaging client).

8) In response to the received SIP MESSAGE from the geomessaging register, the geomessaging enabler 1 (service enabler) sends the grid location to mobile client (geomessaging client). This allows the mobile client (geomessaging client) to be aware of when it needs to report a new location.

9) The IMS gateway sends a SIP SUBSCRIBE to the geomessaging register to be notified of the service enabler (geomessaging enabler) handling the mobile client (geomessaging client).

10) The IMS gateway sends an HTTP 200 OK response to the mobile client (geomessaging client). This response includes the contact information of geomessaging enabler 1.

11) The IMS gateway initiates an IMS session with geomessaging enabler 1 (received from step 9).

The above steps may be carried in a different order. For example, steps 8 and 10 may occur in a reverse order depending on communication and nodes computing delays.

Figure 13:
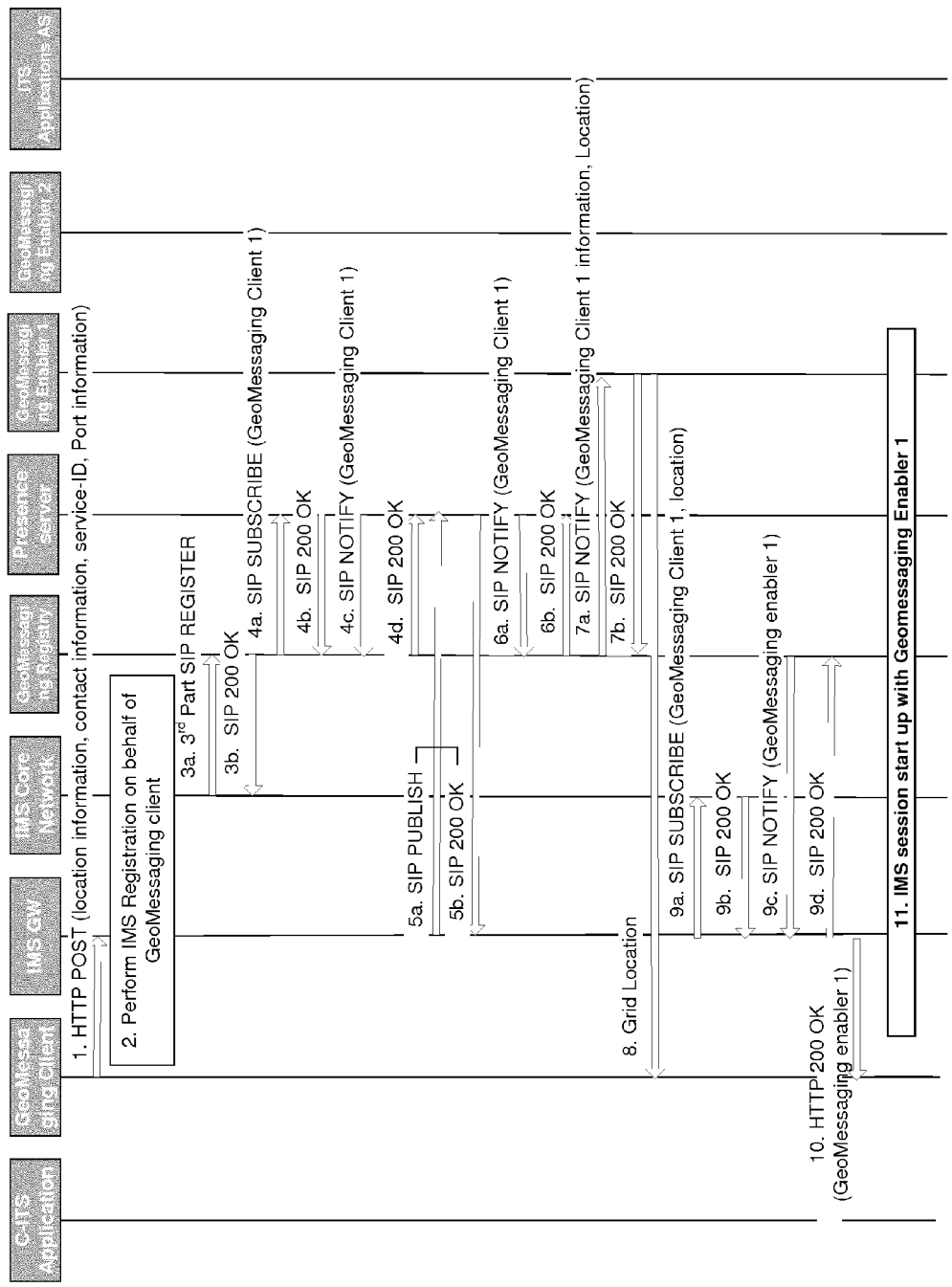
FIG. 13 is a more detailed breakdown of processes illustrated by the message sequence chart of FIG. 12.

FIG. 13 shows a more detailed breakdown of the message sequence chart of FIG. 12. The steps in FIG. 12 are expanded in FIG. 12 keeping the same step numbering, so that steps 3a and 3b are the expansion of step 3 of FIG. 12 and so on.

Figure 14:
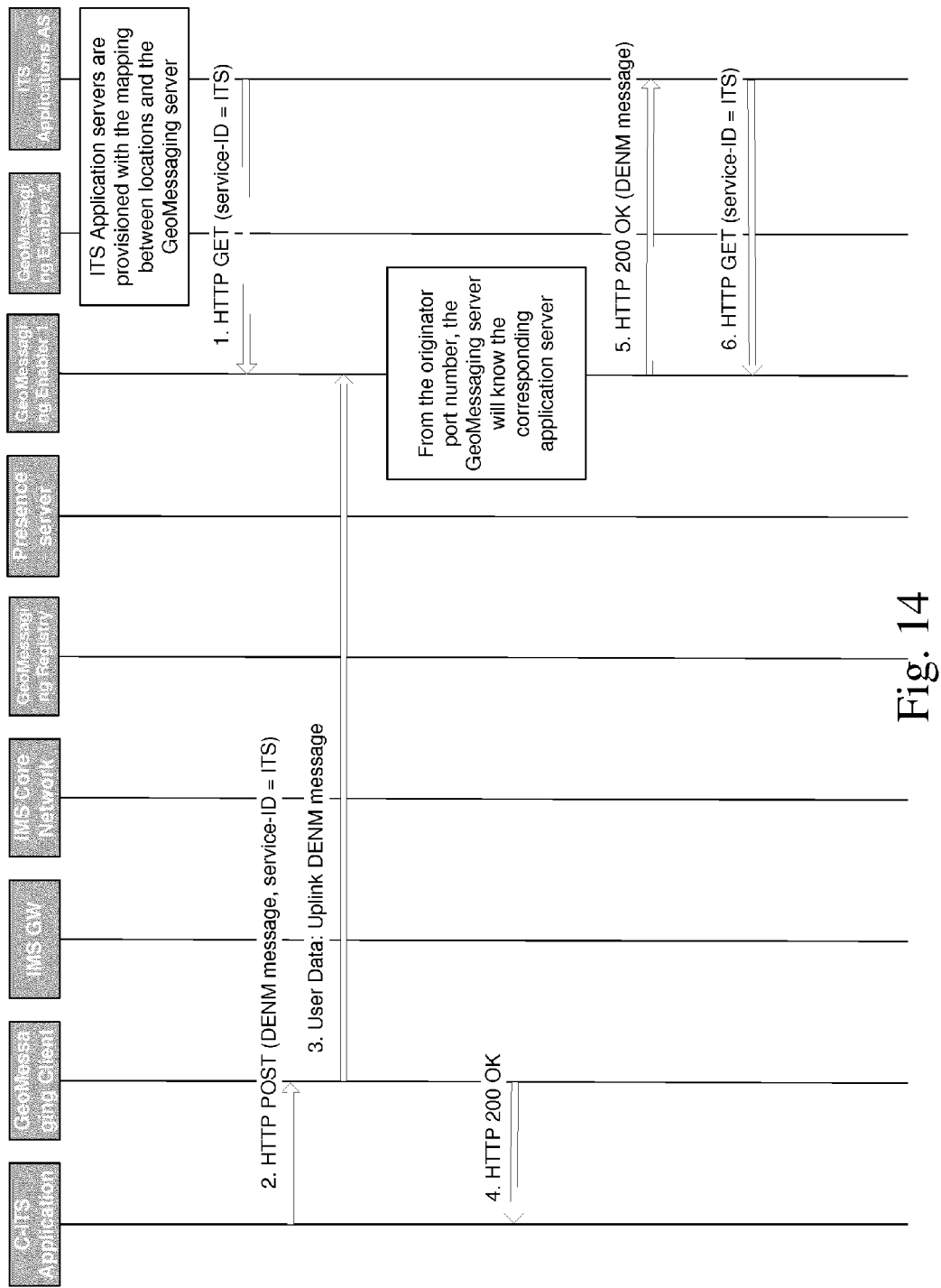
FIG. 14 is a message sequence chart of high-level user plane signaling of an uplink data exchange without QoS, in an IMS context, in one embodiment of the invention.

FIG. 14 is a message sequence chart of high-level user plane signaling of an IMS, uplink (i.e., from ITS to network) data exchange without QoS, in one embodiment of the invention.

In this scenario, it is assumed that ITS application server is preconfigured with the geographical locations covered by the various service enablers (geomessaging enablers) deployed within the network. The ITS application server uses long polling techniques (i.e., suspending on information reception) for receiving information from ITS applications. Long polling is a variation of the traditional polling technique, but it allows emulating a push mechanism under circumstances where a real push is not possible. With long polling, the client requests information from the server in a way similar to a normal polling. However, if the server does not have any information available for the client, then instead of sending an empty response, the server holds the request and waits for information to become available (or for a suitable timeout event), after which a complete response is finally sent to the client.

1) The ITS application server sends an HTTP GET request (i.e., a long polling), to Geomessaging Enabler 1 (service enabler). The ITS application server includes the service-ID ITS within its request. The ITS AS sends such a request to every Geomessaging Enabler (service enabler) deployed in the network.
2) At some point in time, an ITS application has data, pertaining to an event, to be sent out. Hence, the ITS application sends an HTTP POST request to the mobile client (geomessaging client), that includes the DENM message (event to be sent) and the service-ID, being set to ITS.
3) The mobile client (geomessaging client) sends the received data (DENM) to the service enabler (geomessaging enabler) address associated with the ITS and received in step 9 of power-up scenario (as illustrated by FIG. 12). The originator port is also set to the proper port number associated with the ITS application negotiated in step 10 of power up scenario call flow.
4) The mobile client (geomessaging client) sends an HTTP 200 OK response to ITS application to acknowledge the HTTP POST request.
5) Based on the receipt message originator port number, the geomessaging enabler 1 (service enabler) identifies the target application server. Subsequently, the Geomessaging Enabler 1 (service enabler) sends an HTTP 200 OK message to the ITS application server including the DENM message.
6) The ITS application initiates a new long polling by sending an HTTP GET request to the Geomessaging Enabler 1 (service enabler), as in step 1, and the process is repeated again.

The communication means between the entities are not limited to those disclosed above. For example, since the interface between the C-ITS application and the mobile client is an internal interface within the mobile terminal, using HTTP is not mandatory on this reference interface.

Furthermore, the transmission of a DENM message as payload is just an example. Any kind of messages may be transmitted.

Figure 15:
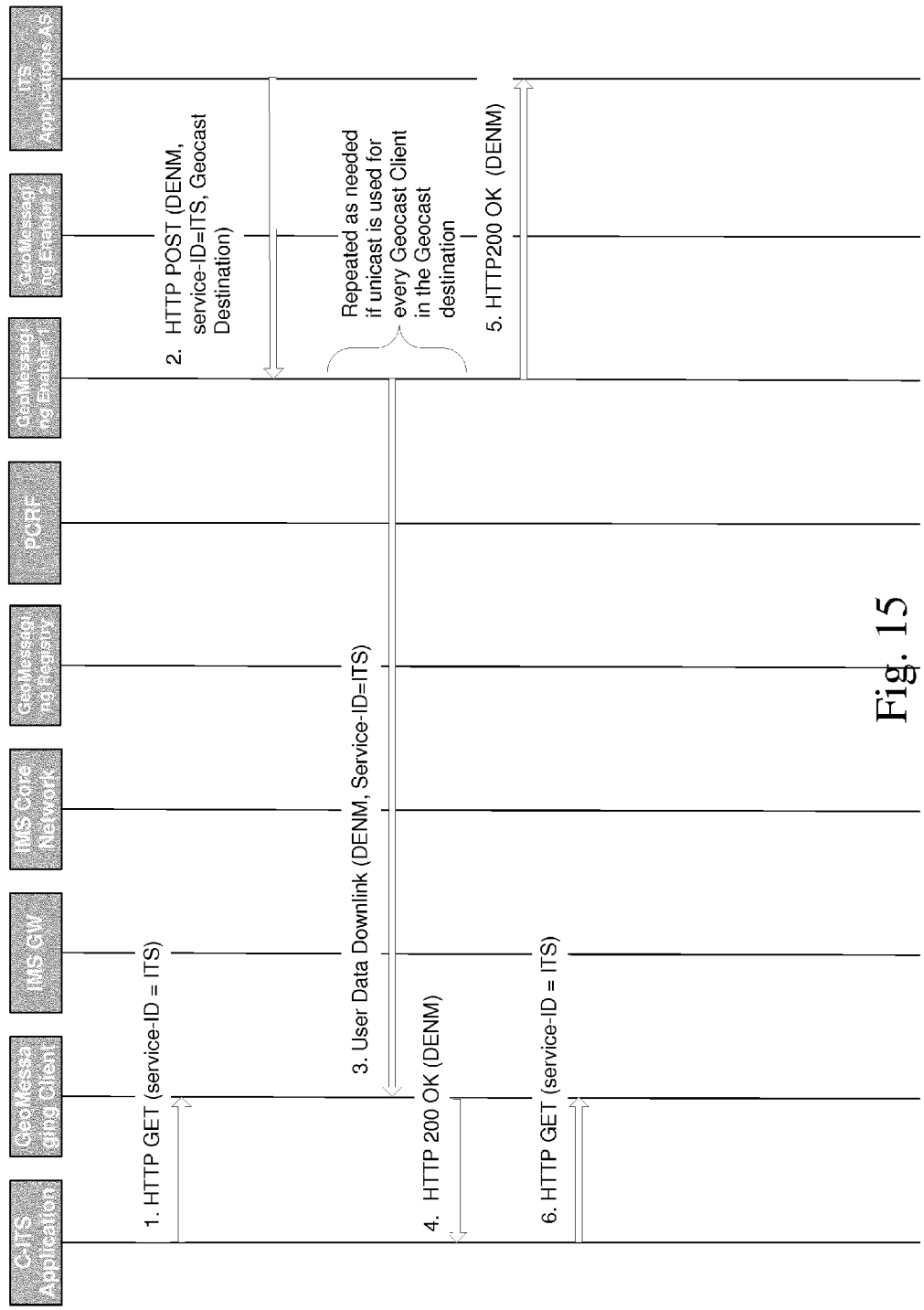
FIG. 15 is a message sequence chart of high-level user plane signaling of a downlink data exchange without QoS, in an IMS context, in one embodiment of the invention.

FIG. 15 is a message sequence chart of high-level user plane signaling of an IMS, downlink (i.e., from network to ITS) data exchange without QoS, in one embodiment of the invention.

In this scenario, it is assumed that the ITS application server is preconfigured with the geographical locations covered by the various service enablers (geomessaging enablers) deployed within the network. In the same manner as in the uplink scenario illustrated with reference to FIG. 14, ITS applications use long polling to receive information from the ITS application server via the service enabler (geomessaging enabler).

1) The ITS application sends an HTTP GET request (i.e., a long polling), to the mobile client (geomessaging client). The ITS application includes the service-ID ITS within its request.
2) At some point in time, an ITS application server has data, pertaining to an event, to be disseminated to a geographical destination. Hence, the ITS application server sends an HTTP POST request to the geomessaging enabler 1 (service enabler), and includes the geographical destination intended for the message. The HTTP POST request includes the DENM message, the service-ID, being set to ITS, and the geocast destination intended for the DENM. The ITS application server may communicate with any number of service enablers (geomessaging enablers) covering the geocast destination of interest.
3) The geomessaging enabler 1 (service enabler) identifies all the geoclients (mobile clients) in the target geographical area and starts forwarding the DENM message to each of them.
4) The mobile client (geoclient) sends an HTTP 200 OK response to the ITS application. The response includes the DENM message for the ITS application. The mobile client (geoclient) uses the received port number in the incoming message to associate the received DENM message with a particular ITS application.
5) Once the geomessaging enabler 1 (service enabler) is done with all mobile clients (geoclients) in its area, the geomessaging enabler 1 (service enabler) sends an HTTP 200 OK response to the ITS AS to close the HTTP transaction that started in step 2.
6) The ITS application sends a new HTTP GET request to the mobile client (geoclient) to restart the long polling process.

Figure 16:
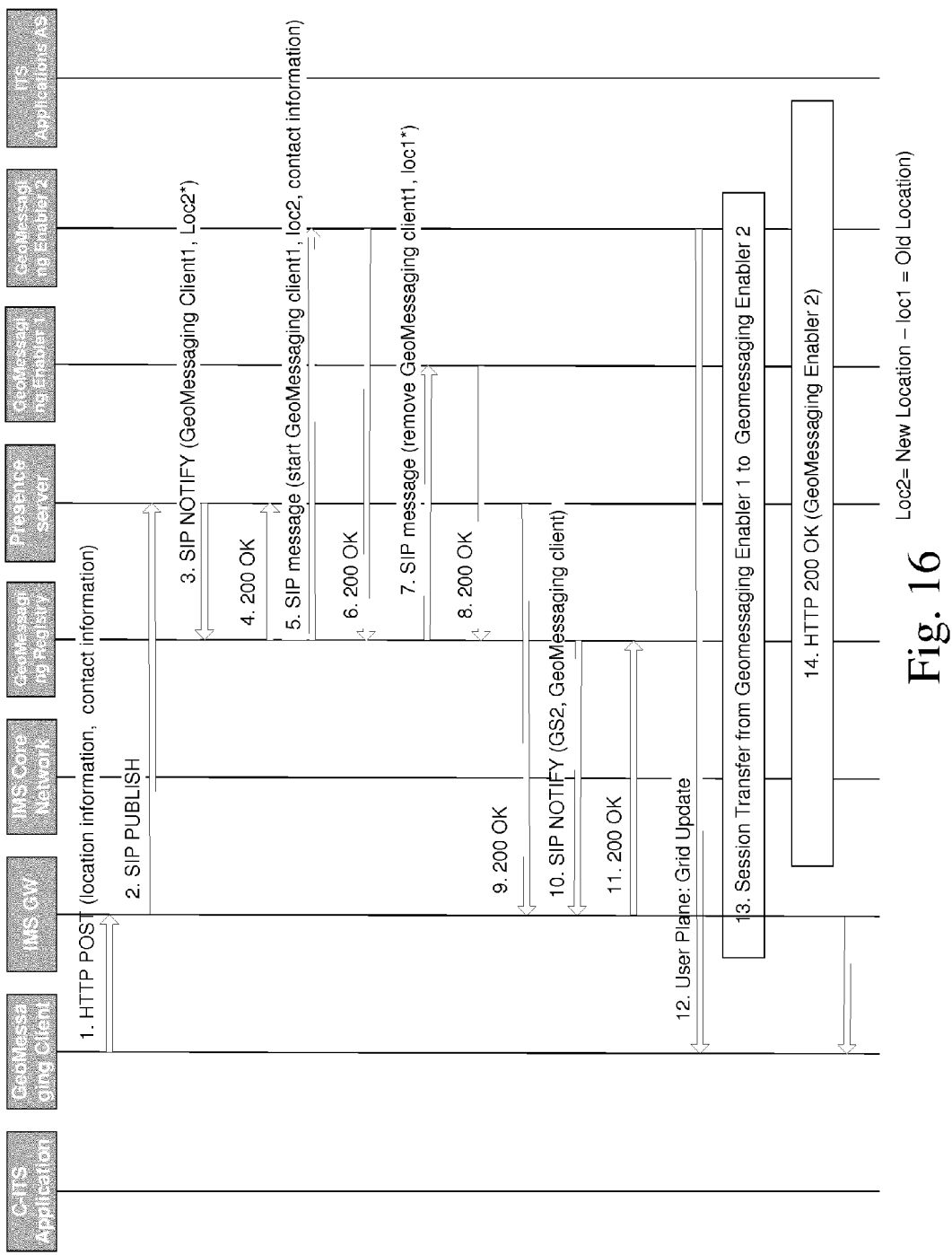
FIG. 16 is a message sequence chart of high-level signaling of a change of service enabler due to a mobile client's vehicle roaming to a new location, in an IMS context, in one embodiment of the invention.

FIG. 16 is a message sequence chart of high-level signaling of a change of service enabler due to a mobile client's vehicle roaming to new location, in one embodiment of the invention. In other words, the service enabler (geomessaging enabler) handling a mobile client (geoclient) has to change due to the mobile client's vehicle roaming to a new location handled by a different service enabler (geomessaging enabler).

1) When the mobile client (geoclient) detects that it has left its current location (e.g., it moves outside the coordinates of its grid tile), the mobile client (geoclient) sends an HI IF POST request to the IMS gateway to report its new location. The request includes the coordinates for the new location and the ITS contact information.
2) The IMS gateway sends a SIP PUBLISH message to the presence server to report its new location using existing procedures, such as for example the procedures disclosed in 3GPP TS 24.229 V11.7.0 (2013 March), sub-clause 5.41.7, in that regard.
3) The presence server sends a SIP NOTIFY message to the geomessaging register, indicating the mobile client (geomessaging client) identity and its new location.
4) The geomessaging register returns a SIP 200 OK response to the presence server.
5) In this case, the geomessaging register detects that a new geomessaging enabler (service enabler), i.e. geomessaging enabler 2, has to handle (i.e., take over) the mobile client (geoclient) in the light of the mobile client's new location. Hence, the geomessaging register sends a SIP MESSAGE to the new geomessaging enabler 2 (service enabler) to start handling the mobile client (geoclient). The request includes the geoclient's (mobile client's) new location and contact information.

6) The geomessaging enabler 2 returns a SIP 200 OK response message to geomessaging register.
7) The geomessaging register then sends a SIP MESSAGE to the old geomessaging enabler 1 that used to handle the mobile client (geoclient) to request it to remove the mobile client (geoclient) contact information from the old location,
8) The geomessaging enabler 1 returns a SIP 200 OK message to the geomessaging register.
9) The presence server then returns a SIP 200 OK message to the IMS gateway in response to the SIP PUBLISH request that it has received,
10) The geomessaging register sends SIP NOTIFY message to notify the IMS gateway that the geomessaging enabler 2 is now handling the mobile client (geoclient). This allows the IMS gateway to establish communication with the new geomessaging enabler 2.
11) The IMS gateway then returns a SIP 200 OK response to the geomessaging register.
12) The geomessaging enabler 2 sends a grid update message via user plane to the mobile client (geoclient).
13) The IMS gateway terminates the session with the old geomessaging enabler 1 and initiates a new session with the new geomessaging enabler 2.
14) Finally, the IMS gateway sends an HTTP 200 OK response to the mobile client (geoclient) to complete the HTTP transaction. The response includes the contact information for the geomessaging enabler 2.

Figure 17:
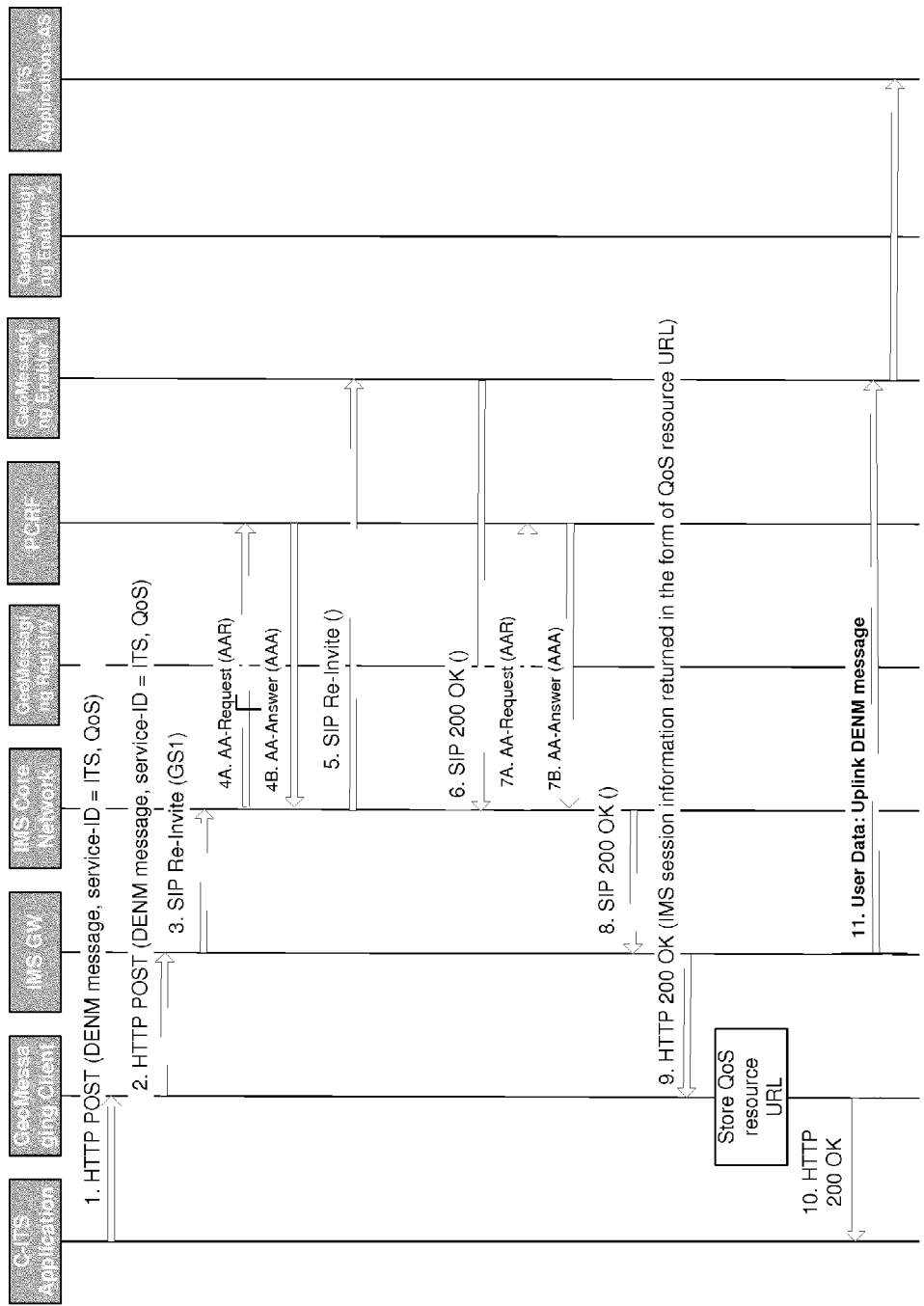
FIG. 17 is a message sequence chart of high-level signaling of an IMS establishment with QoS and further uplink data transmission, in one embodiment of the invention.

FIG. 17 is a message sequence chart of high-level signaling of an IMS establishment with QoS and further uplink data transmission scenario, in one embodiment of the invention. FIG. 17 illustrates a request by an ITS application for a QoS and the core network handling of such a request.

Indeed, an ITS application may require QoS for transmission of an event. To that effect, the ITS application declares the need for QoS when it interacts with the mobile client (geoclient). The core network ensures that the nodes responsible for providing the requested QoS are properly configured in accordance with the core network policies. The granted QoS is known to the ITS application. Subsequent to the event transmission, the ITS application may modify the QoS to other values or terminate its request for QoS for subsequent event transmissions.

1) in this example, C-ITS application sends, to the mobile client (geoclient), an HTTP POST request to request the transmission of an event and includes the QoS in this case in addition to the DENM event and the service-ID being set to ITS.
2) The mobile client (geoclient) performs the necessary validation for the received message and then forwards the message to the IMS gateway.
3) The IMS gateway has already an existing IMS session for the mobile client (geoclient). Hence, the IMS gateway detects the need to update the session with the requested QoS. To that effect, the IMS gateway sends a SIP Re-INVITE message to the service enabler associated with the mobile client (geoclient), i.e. geomessaging enabler 1, via the IMS core network to modify the session QoS characteristics.
4) Interaction with the PCRF:
    4a. The IMS core network validates the requested QoS and sends to the PCRF node a Diameter AA-Request (AAR) message that includes the requested QoS in addition to other information.
    4b. The PCRF approves the requested QoS or modifies it if need be and returns the granted QoS in a Diameter AA-Answer (AAA) message.
5) The IMS core network then forwards the SIP Re-INVITE to geomessaging enabler 1.
6) Geomessaging enabler 1 returns a SIP 200 OK response to the IMS core network.
7) Interaction with the PCRF:
    7a. Steps 7a and 7b are optional depending on the geomessaging enabler 1 and if it modified the QoS received in step 5. It is assumed in this case that the geomessaging enabler 1 modified the QoS received in step 5. In this case, the IMS core network sends to the PCRF node a Diameter AA-Request (AAR) message that includes the received QoS from the geomessaging enabler 1.
    7b. The PCRF approves the requested QoS or modifies it if necessary and returns the granted QoS in a Diameter AA-Answer (AAA) message.
8) The IMS core network returns a SIP 200 OK message to the IMS gateway.
9) The IMS gateway then returns to the mobile client (geoclient) the IMS session information in the form of a QoS URL in an HTTP 200 OK response.
10) The mobile client (geoclient) stores the received QoS URL and binds it to the ITS application. The mobile client (geoclient) sends back to the ITS application an HTTP 200 OK response to terminate the HTTP transaction.
11) Thereafter, the IMS gateway sends user data via uplink DENM message to the geomessaging enabler 1, which forwards the DENM event further to the ITS application server.

Figure 18:
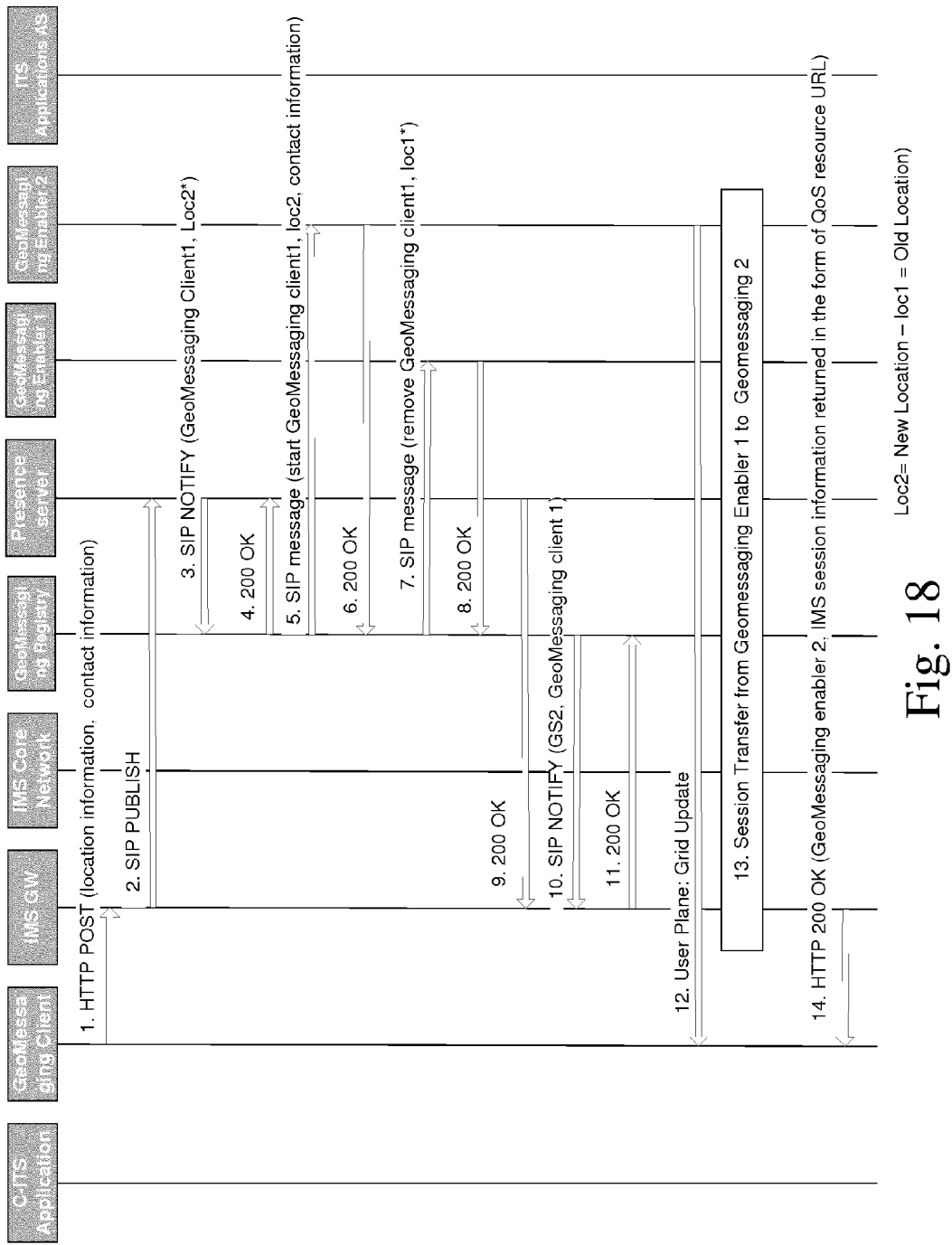
FIG. 18 is a message sequence chart of high-level signaling of a change of service enabler due to a mobile client's vehicle roaming to a new location, with QoS, in an IMS context, in one embodiment of the invention.

FIG. 18 is a message sequence chart of high-level signaling of a change of service enabler (geomessaging enabler) due to a mobile client's vehicle roaming to new location, with QoS, in one embodiment of the invention. If the IMS session has been established with some QoS requested previously by an ITS application and the request is still pending, then the procedure described previously will be slightly altered. FIG. 18 is a message sequence chart of such a scenario. The message sequence chart is essentially the same as the one of FIG. 16 except that, after step 13, when the new IMS session is established and the old IMS session is torn down, the IMS gateway includes IMS session in form of QoS resource URL in the HTTP 200 OK response, where previously no such URL is returned back to the mobile client (geoclient). The returned QoS URL allows the mobile client (geoclient) to modify the QoS.

Figure 19:
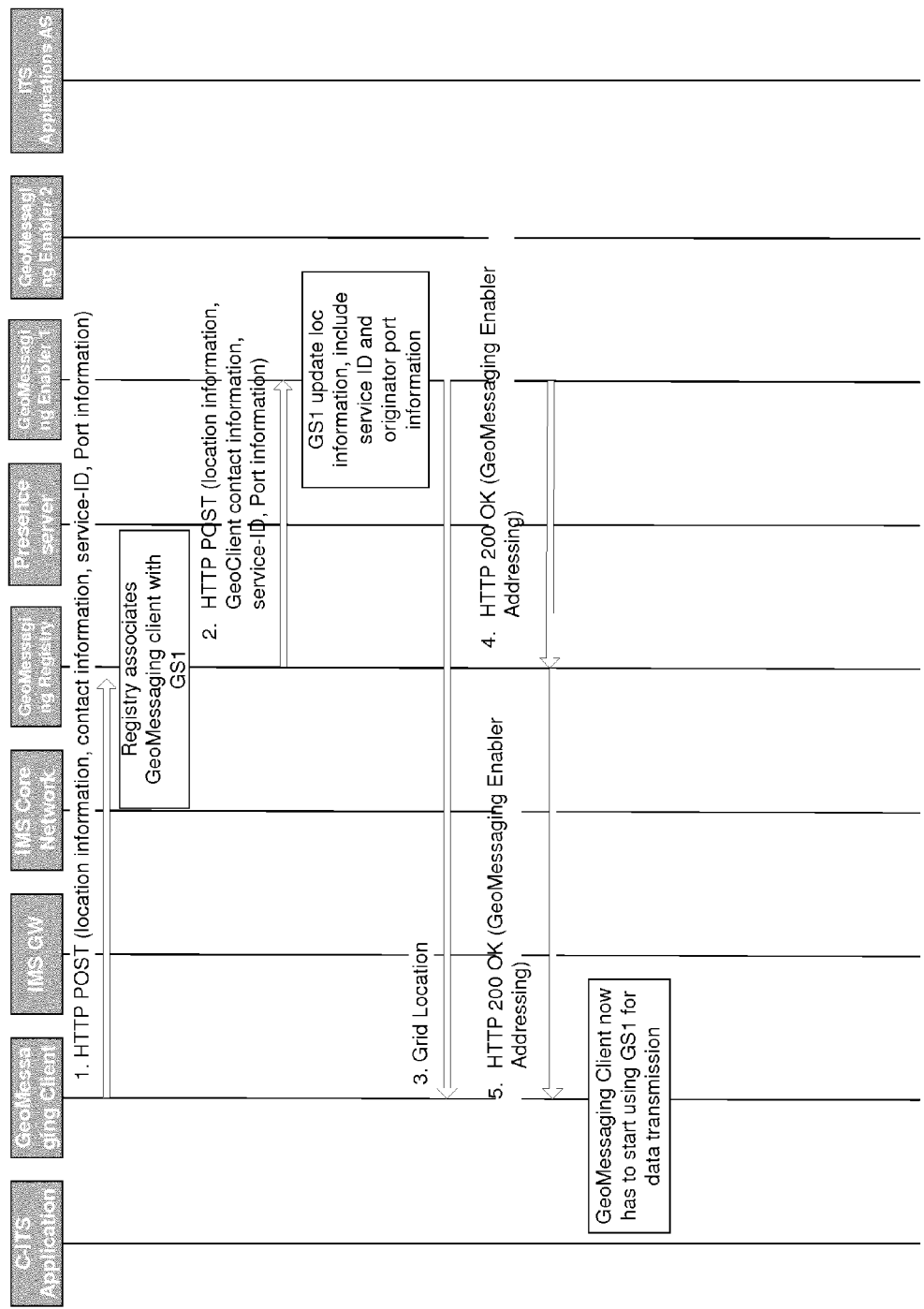
FIG. 19 is a message sequence chart of high-level signaling of a power start-up in an IMS context, in one embodiment of the invention.

FIG. 19 is a message sequence chart of high level signaling of a non-IMS power start-up in one embodiment of the invention. The exchanges of messages illustrated in FIG. 19 occur at power up of an intelligent transport system (ITS) involving a mobile client, also referred to as geomessaging client or geoclient.

1) At power-up, the mobile client (geoclient) registers with the geomessaging register by sending an HTTP POST message to the geomessaging register. Registration information in the registration message includes location information (i.e., geographical coordinates), contact information for the ITS (IP address or domain information), service ID (used by the service enabler (geomessaging enabler) to select the intended AS bound to the service ID), and its port information (to be used by service enabler (geomessaging enabler) for downlink communication with applications). This step corresponds to step s10 as illustrated on FIGS. 1 and 2.
2) Upon successful registration, and after consulting its internal information, the geomessaging register locates the service enabler (geomessaging enabler) address (in this case, geomessaging enabler 1 is responsible for the received location), and geomessaging register then sends a HTTP POST message to geomessaging enabler 1 to handle mobile client (geoclient), and includes the contact information for the mobile client (geoclient). This step corresponds to step s20 as illustrated on FIGS. 1 and 2.
3) After the HTTP POST message is received from the geomessaging register, geomessaging enabler 1 sends the grid location (e.g., the coordinates of its grid tile) to the mobile client (geoclient). This allows the mobile client (geoclient) to know when it needs to report a new location. This step corresponds to step s30 as illustrated on FIGS. 1 and 2.
4) In response to the received HTTP POST from the geomessaging register, geomessaging enabler 1 sends an HTTP 200 to the geomessaging register including the geomessaging enabler 1 address (i.e., the contact information to be used by the mobile client (geoclient) for handling for example DENM/CAM geocasting). This step corresponds to step s40 as illustrated on FIGS. 1 and 2.
5) The geomessaging register forwards the received HTTP POST message to the mobile client (geoclient). This step corresponds to step s50 as illustrated on FIGS. 1 and 2.

The mobile client may then be connected to the service enabler for receiving the network service (as illustrated by the box labeled: "GeoMessaging Client now has to start using GS1 for data transmission"). In other words, the mobile client may exchange information with the service enabler so that the network service may be provided. This step corresponds to step s60 as illustrated on FIGS. 1 and 2.

The above steps may be carried in a different order. For example, steps 3 and 5 may occur in a reverse order depending on the communication and nodes computing delays.

Figure 20:
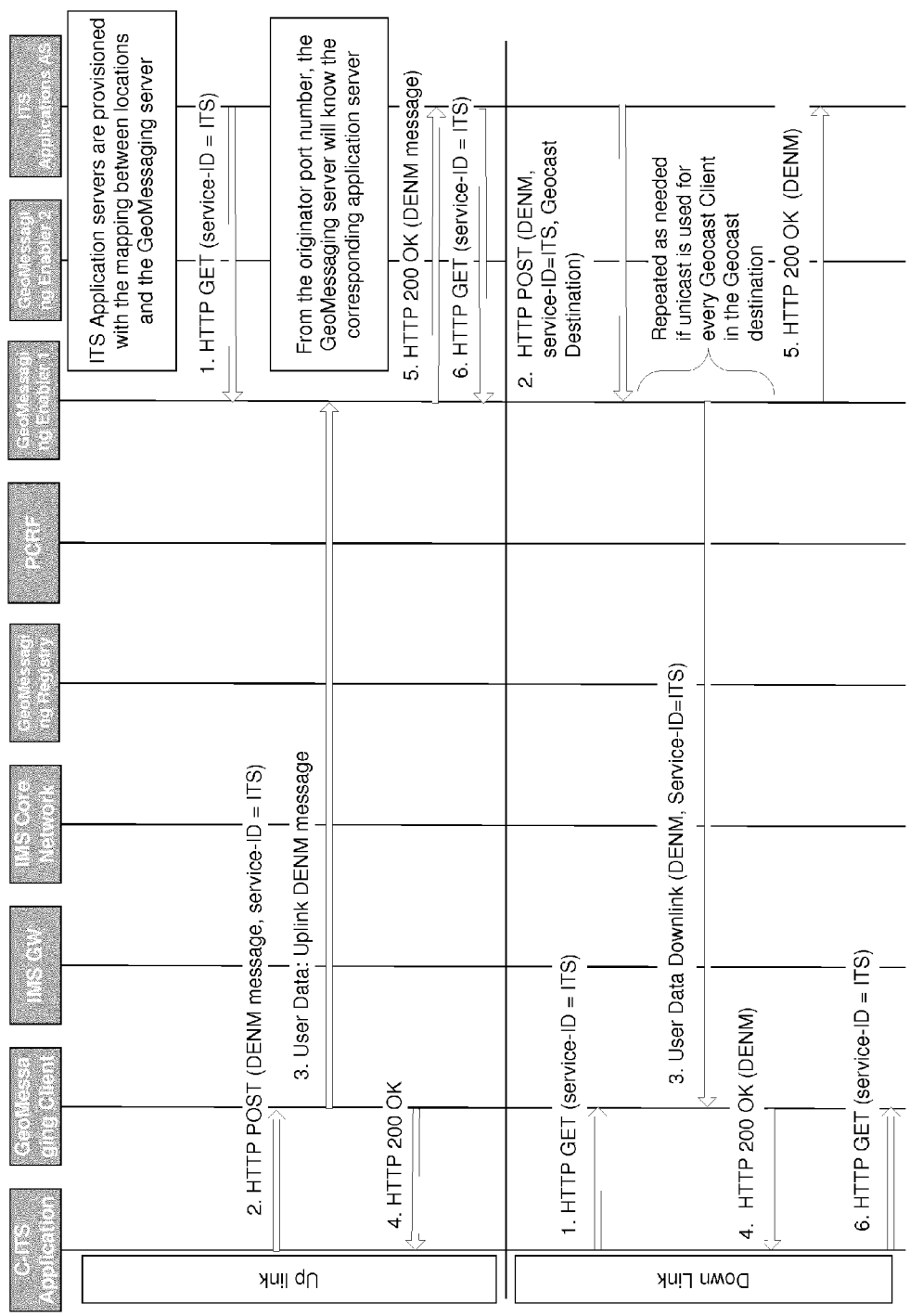
FIG. 20 is a message sequence chart of high-level user plane signaling of an uplink and downlink data exchange without QoS, in one embodiment of the invention.

FIG. 20 is a message sequence chart of high-level user plane signaling of an uplink and downlink data exchange without QoS, in one embodiment of the invention. The relevant steps are identical to those described in the IMS case for uplink with reference to FIGS. 14 and 15.

Figure 21:
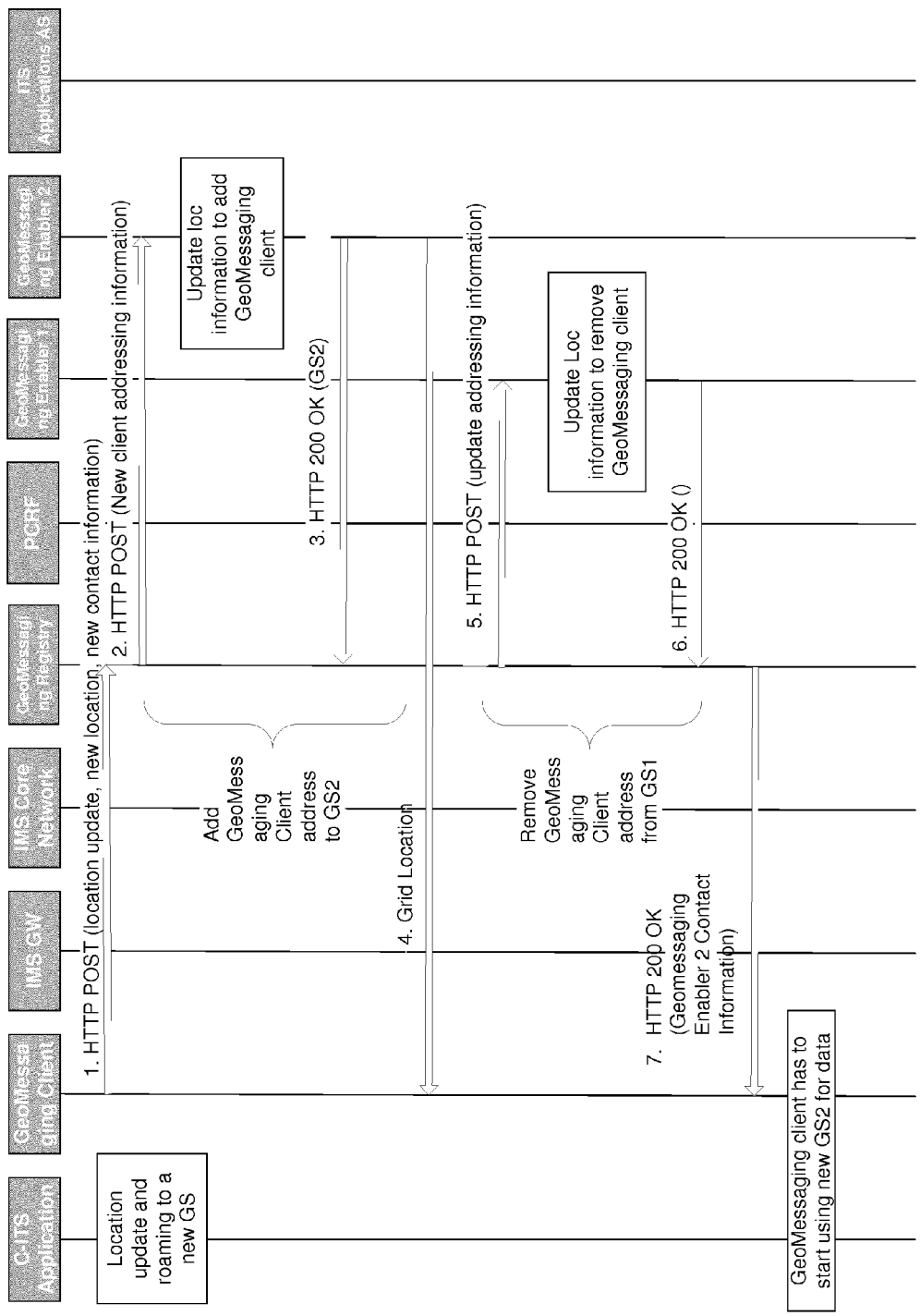
FIG. 21 is a message sequence chart of high-level signaling of a change of service enabler due to a mobile client's vehicle roaming to a new location, without QoS, in an (MS context, in one embodiment of the invention.

FIG. 21 is a message sequence chart of the high-level signaling of a change of service enabler due to a mobile client's vehicle roaming to new location, without QoS, in a non-IMS context, in one embodiment of the invention. In other words, the service enabler (geomessaging enabler) handling a mobile client (geoclient) has to change due to the mobile client's vehicle roaming to a new location handled by a different service enabler (geomessaging enabler).
1) When a mobile client (geoclient) detects that it has left its current location, the mobile client (geoclient) sends an HTTP POST request to the geomessaging register to report its new location. The request includes the coordinates for the new location and the ITS contact information.
2) In this case, the geomessaging register detects that a new service enabler, (geomessaging enabler), namely geomessaging enabler 2, has to handle (take over) the mobile client (geoclient) due to the new location. Hence, the geomessaging register, sends a HTTP POST message to the new geomessaging enabler 2 to start handling the mobile client (geoclient). The request includes the new location and the mobile client (geoclient) contact information.
3) The geomessaging enabler 2 returns a HTTP 200 OK response message to geomessaging register.
4) Geomessaging enabler 2 sends a grid update message via user plane to the mobile client (geoclient).
5) The geomessaging register then sends an HTTP POST to the old geomessaging enabler 1 that used to handle the mobile client (geoclient) to request it to remove the mobile client (geoclient) contact information from the old location.
6) The geomessaging enabler 1 returns a HTTP 200 OK message to the geomessaging register.
7) The geomessaging register, upon completion of the updating process of geomessaging enablers 1 and 2, responds to the HTTP POST message received at step 1. The resulting HTTP 200 OK includes geomessaging enabler 2 contact information that allows the mobile client (geoclient) to establish communication with the new geomessaging enabler 2.

Figure 22:
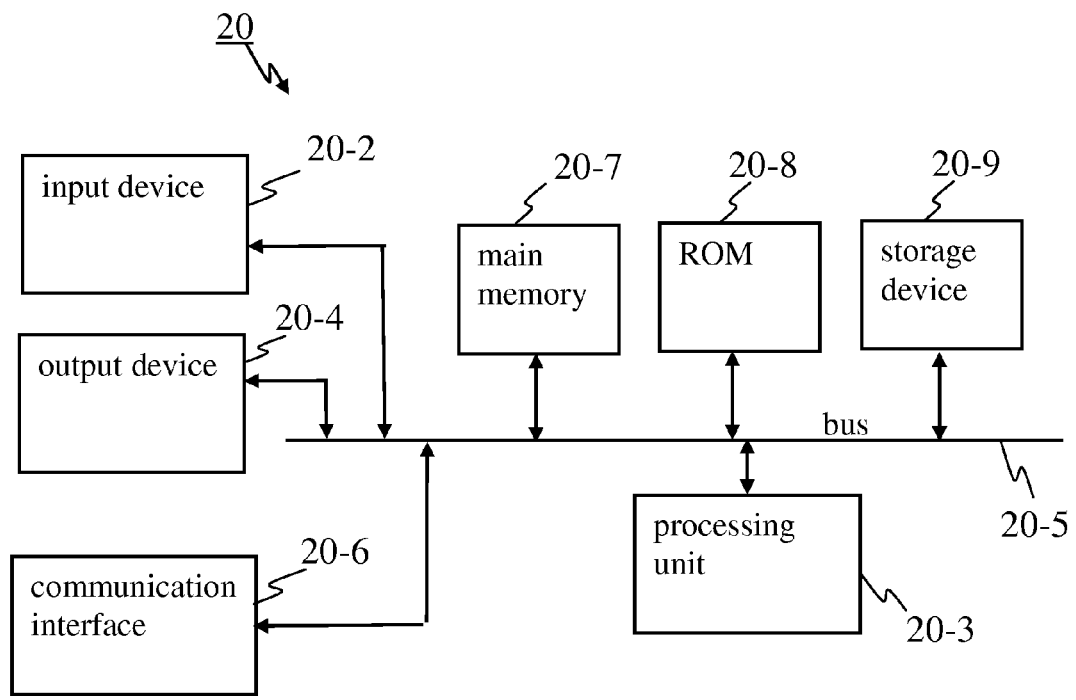
FIG. 22 is a schematic diagram of an exemplary implementation of a network node 20 that may host a service enabler usable in embodiments of the invention.

FIG. 22 is a schematic diagram of an exemplary implementation of a network node 20 that may host a service enabler usable in embodiments of the invention. As illustrated, network node 20 may include a bus 20-5, a processing unit 20-3, a main memory 20-7, a ROM 20-8, a storage device 20-9, an input device 20-2, an output device 20-4, and a communication interface 20-6. Bus 20-5 may include a path that permits communication among the components of network node 20.

Processing unit 20-3 may include a processor, a microprocessor, or processing logic that may interpret and execute instructions. Main memory 20-7 may include a RAM or another type of dynamic storage device that may store information and instructions for execution by processing unit 20-3. ROM 20-8 may include a ROM device or another type of static storage device that may store static information and instructions for use by processing unit 20-3. Storage device 20-9 may include a magnetic and/or optical recording medium and its corresponding drive.

Input device 20-2 may include a mechanism that permits an operator to input information to network node 20, such as a keypad, a keyboard, a mouse, a pen, voice recognition and/or biometric mechanisms, etc. Output device 20-4 may include a mechanism that outputs information to the operator, including a display, a printer, a speaker, etc. Communication interface 20-6 may include any transceiver-like mechanism that enables network node 20 to communicate with other devices and/or systems (such as with a mobile client, an AS, a proxy enabler or a geomessaging register). For example, communication interface 20-6 may include mechanisms for communicating with another device or system via a network.

Network node 20 may perform certain operations or processes described herein. These operations may be performed in response to processing unit 20-3 executing software instructions contained in a computer-readable medium, such as main memory 20-7, ROM 20-8, and/or storage device 20-9. A computer-readable medium may be defined as a physical or a logical memory device. For example, a logical memory device may include memory space within a single physical memory device or distributed across multiple physical memory devices. Each of main memory 20-7, ROM 20-8 and storage device 20-9 may include computer-readable media. The magnetic and/or optical recording media (e.g., readable CDs or DVDs) of storage device 20-9 may also include computer-readable media. The software instructions may be read into main memory 20-7 from another computer-readable medium, such as storage device 20-9, or from another device via communication interface 20-6.

The software instructions contained in main memory 20-7 may cause processing unit 20-3 to perform operations or processes described herein, such as those characterizing the service enabler. Alternatively, hardwired circuitry may be used in place of or in combination with software instructions to implement processes and/or operations described herein. Thus, implementations described herein are not limited to any specific combination of hardware and software.

Figure 23:
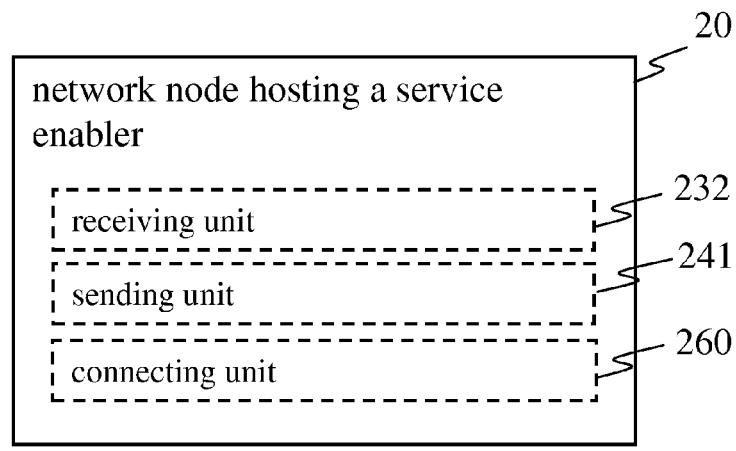
FIG. 23 schematically illustrates a network node hosting a service enabler, in one embodiment of the invention.

FIG. 23 schematically illustrates, as one embodiment of the invention, a network node 20 hosting a service enabler for participating in providing a network service in a communication network 50 covering a geographical area for a plurality of mobile clients 40. The network node illustrated on FIG. 23 may for example be implemented as illustrated on FIG. 22.

Network node 20 hosts a service enabler and may comprise a so-called receiving unit 232, a so-called sending unit 241 and a so-called connecting unit 260.

Receiving unit 232 may for example be configured for receiving s30-2, from a geomessaging register 30, contact information of a mobile client 40 amongst the plurality of mobile clients 40. Sending unit 241 may for example be configured for sending s40-1, to the geomessaging register 30, contact information of the service enabler 20. Finally, connecting unit 260 may for example be configured for participating in connecting s60 the mobile client 40 to the service enabler 20 for receiving the network service.

In one embodiment, network node 20 hosting a service enabler is further configured for maintaining a list of the target areas, a target area being a service distribution area defined by an application server 10, and distribution areas, a distribution area being defined by tiles and its coordinates, which correspond to target areas.

In one embodiment, network node 20 hosting a service enabler is further configured for maintaining a list of the identities of mobile clients 40 inside any geographical area based on the mobile clients 40 updating the service enabler 20 any time they leave their current geographical area and enter into a new area, and based on these mobile clients 40 being updated with the coordinates of their current geographical area so they can send the location update message once they leave that area. In this embodiment, network node 20 may be further configured for, upon initiation from an application server 10, disseminating geocasted messages from the application server 10 to concerned mobile clients 40 in accordance with the locations requested by the application server 10.

Figure 24:
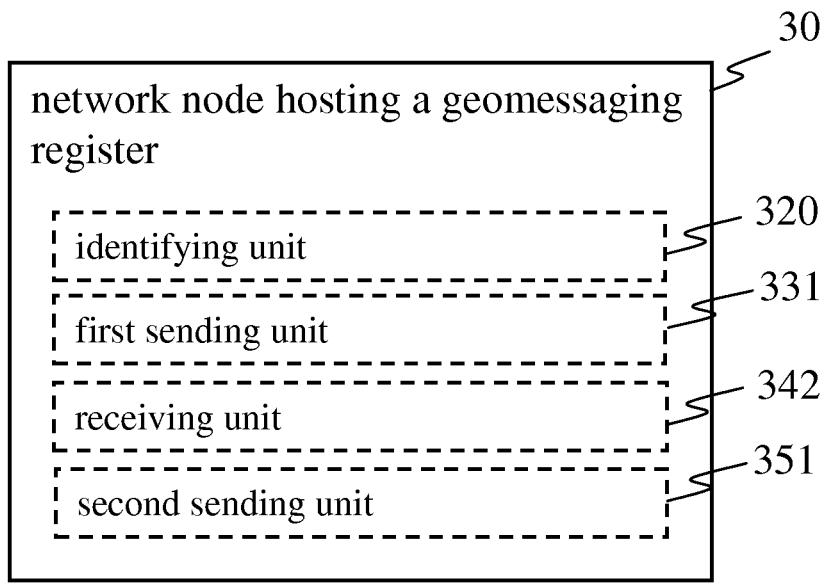
FIG. 24 schematically illustrates a network node hosting a geomessaging register, in one embodiment of the invention.

FIG. 24 schematically illustrates, as one embodiment of the invention, a network node 30 hosting a geomessaging register for participating also in providing a network service in a communication network 50 covering a geographical area for a plurality of mobile clients 40. The network node illustrated on FIG. 24 may for example be implemented as illustrated on FIG. 22.

Network node 30 hosts a geomessaging register and may comprise a so-called identifying unit 320, a so-called first sending unit 331, a so-called receiving unit 342, and a so-called second sending unit 260.

Identifying unit 320 may for example be configured for identifying s20 a service enabler 20 based on registration information of a mobile client 40 amongst the plurality of mobile clients 40, wherein the registration information relates to the registration of the mobile client 40 to the communication network 50. First sending unit 331 may for example be configured for sending s30-1, to the identified service enabler 20, contact information of said mobile client 40. Receiving unit 342 may for example be configured for receiving s40-2, from the service enabler 20, contact information of the service enabler 20. Finally, second sending unit 260 may for example be configured for sending s50-1, to the mobile client 40, said contact information of the service enabler 20.

In one embodiment, network node 30 hosting a geomessaging register is further configured for (i) handling geomessaging location updates coming from the mobile clients 40; (ii) keeping track of the geographical areas covered by the service enablers 20; (iii) assigning the mobile client 40 to the appropriate service enabler 20; and (iv) in case of a location change, initiating a hand-over between service enablers 20.

Figure 25:
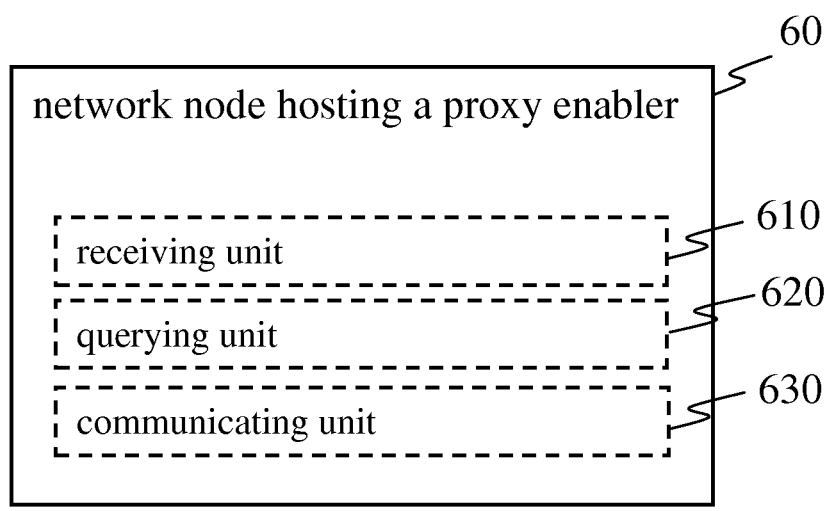
FIG. 25 schematically illustrates a network node hosting a proxy enabler, in one embodiment of the invention.

FIG. 25 schematically illustrates, as one embodiment of the invention, a network node 60 hosting a proxy enabler for participating in providing a network service in a communication network 50 covering a geographical area for a plurality of mobile clients 40. The network node illustrated on FIG. 25 may for example be implemented as illustrated on FIG. 22.

Network node 60 hosts a proxy enabler and may comprise a so-called receiving unit 610, a so-called querying unit 620, and a so-called communicating unit 630. Receiving unit 610 may for example be configured for receiving, by an application server 10, a request specifying a distribution target area. Querying unit 620 may be configured for querying a geomessaging register 30 for obtaining information about an appropriate service enabler 20 for handling a request associated with the specified distribution target area. Finally, communicating unit 630 may be configured for communicating with the appropriate service enabler 20 in order for the received request to be handled by said appropriate service enabler 20.

In one embodiment, network node 60 hosting a proxy enabler is further configured for caching replies from the geomessaging register 30 in order to enable the provision of faster responses to subsequent requests from application servers 10.

In one embodiment, network node 60 hosting a proxy enabler is further configured subscribing to the geomessaging register 30 to get a notification of changes to the assignments of service enablers 20 to geographical areas.

In one embodiment, the step of subscribing, by the proxy enabler, to the geomessaging register 30 uses a publish/subscribe scheme or a database replication technology.

In view of the above, the following advantages are therefore provided by some embodiments of the invention. Geomessaging methods and network nodes are improved by providing a scalable architecture which is particularly suitable for actual deployment in large-scale environments. The IMS-based embodiments make it possible to seamlessly integrate the geomessaging-based message distribution with the session handling in a cellular communication network.

The ability to use standard mechanisms for setting up and modifying sessions make it possible to identify the sessions using for example ITS messages and applying to them specific policies, such as for example, specific QoS (so that time-critical communication can be properly prioritized throughout the network) or specific charging.

Adding a proxy enabler helps reducing complexity by decoupling the internal procedure to manage service enablers and their coverage areas from the application servers. The application servers have a single point of contact, independently of the internal reconfiguration of the geomessaging architecture. This simplifies the operation of the geomessaging system.

Where the terms "receiving unit", "sending unit", "connecting unit", "identifying unit", "first sending unit", "second sending unit", "querying unit", "communicating unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned receiving unit, sending unit, connecting unit, identifying unit, first sending unit, second sending unit, querying unit, communicating unit, etc. is replaced by receiving means, sending means, connecting means, identifying means, first sending means, second sending means, querying means, communicating means, etc. respectively, for carrying out the functions of the receiving unit, sending unit, connecting unit, identifying unit, first sending unit, second sending unit, querying unit, communicating unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

3GPP 3rd Generation Partnership Project
AAA Authentication and Authorization Answer (in the Diameter protocol)
AAR Authentication and Authorization Request (in the Diameter protocol)
C-ITS Cooperative Intelligent transport systems
C2C Car-to-car communication
C2I Car-to-infrastructure communication
C2X Car-to-car and/or -infrastructure communication
CAM Cooperative Awareness Message
CHW Cellular Hazard Warning
DENM Decentralized Environmental Notification Message
ETSI European Telecommunications Standards Institute
GPRS General packet radio service
GW Gateway
HSPA High Speed Packet Access
IMS IP Multimedia Subsystem
IP Internet Protocol
ITS Intelligent transport systems
ITS-S ITS station
LTE Long-Term Evolution
PCRF Policy and charging rules function
QoS Quality of Service
SIP Session Initiation Protocol
SPaT Signal Phase and Time
TC Technical committee
W-CDMA Wideband Code Division Multiple Access
WiMAX Worldwide Interoperability for Microwave Access

The invention claimed is:

1. A method for providing a network service in a communication network covering a geographical area for a plurality of mobile clients, the method comprising:
registering a mobile client to the communication network, the mobile client being one of the plurality of mobile clients;
identifying, among a plurality of service enablers, a service enabler by a geomessaging register based on a registration information of said mobile client, wherein
each service enabler is configured to address mobile clients in a designated geographical area; and
the geomessaging register is configured to keep track of the geographical areas covered by each of the service enablers;
sending, by the geomessaging register to the identified service enabler, a contact information of said mobile client;
sending, by the service enabler to the geomessaging register, a contact information of the service enabler;
sending, by the geomessaging register to the mobile client, said contact information of the service enabler;
connecting the mobile client to the service enabler for receiving the network service;
notifying a server of a location of said mobile client and the geomessaging register of said client registration;
subscribing said geomessaging register to the server; and
notifying said geomessaging register by the server of said client location.

2. A method for providing a network service in a communication network covering a geographical area for a plurality of mobile clients, the method comprising:
registering a mobile client to the communication network, the mobile client being one of the plurality of mobile clients;
identifying, among a plurality of service enablers, a service enabler by a geomessaging register based on a registration information of said mobile client, wherein
each service enabler is configured to address mobile clients in a designated geographical area; and
the geomessaging register is configured to keep track of the geographical areas covered by each of the service enablers;
sending, by the geomessaging register to the identified service enabler, a contact information of said mobile client;
sending, by the service enabler to the geomessaging register, a contact information of the service enabler;
sending, by the geomessaging register to the mobile client, said contact information of the service enabler;
connecting the mobile client to the service enabler for receiving the network service; and
providing by the service enabler to the mobile client of at least one grid tile of a grid covering at least part of the geographical area with grid fields.

3. The method of claim 2, wherein the grid is framed by grid lines and is spaced by grid spacing.

4. A method for providing a network service in a communication network covering a geographical area for a plurality of mobile clients, the method comprising:
registering a mobile client to the communication network, the mobile client being one of the plurality of mobile clients;
identifying, among a plurality of service enablers, a service enabler by a geomessaging register based on a registration information of said mobile client, wherein
each service enabler is configured to address mobile clients in a designated geographical area; and
the geomessaging register is configured to keep track of the geographical areas covered by each of the service enablers;
sending, by the geomessaging register to the identified service enabler, a contact information of said mobile client;

sending, by the service enabler to the geomessaging register, a contact information of the service enabler;
sending, by the geomessaging register to the mobile client, said contact information of the service enabler; and
connecting the mobile client to the service enabler for receiving the network service,
wherein the network service is a localized information service.

5. A method for providing a network service in a communication network covering a geographical area for a plurality of mobile clients, the method comprising:
registering a mobile client to the communication network, the mobile client being one of the plurality of mobile clients;
identifying, among a plurality of service enablers, a service enabler by a geomessaging register based on a registration information of said mobile client, wherein
each service enabler is configured to address mobile clients in a designated geographical area; and
the geomessaging register is configured to keep track of the geographical areas covered by each of the service enablers;
sending, by the geomessaging register to the identified service enabler, a contact information of said mobile client;
sending, by the service enabler to the geomessaging register, a contact information of the service enabler;
sending, by the geomessaging register to the mobile client; said contact information of the service enabler; and
connecting the mobile client to the service enabler for receiving the network service,
wherein the communication network is a cellular network.

6. A method for providing a network service in a communication network covering a geographical area for a plurality of mobile clients, the method comprising:
registering a mobile client to the communication network, the mobile client being one of the plurality of mobile clients;
identifying, among a plurality of service enablers, a service enabler by a geomessaging register based on a registration information of said mobile client, wherein
each service enabler is configured to address mobile clients in a designated geographical area; and
the geomessaging register is configured to keep track of the geographical areas covered by each of the service enablers;
sending, by the geomessaging register to the identified service enabler, a contact information of said mobile client;
sending, by the service enabler to the geomessaging register, a contact information of the service enabler;
sending, by the geomessaging register to the mobile client, said contact information of the service enabler;
connecting the mobile client to the service enabler for receiving the network service,
wherein the service enabler is a network node;
maintaining relationships between the plurality of Mobile clients and their geographical location; and
exposing an interface for offering a plurality of services to application servers.

7. A geomessaging register node for participating in providing a network service in a communication network covering a geographical area for a plurality of mobile clients, the geomessaging register node being configured for:
identifying, among a plurality of service enablers, a service enabler based on a registration information of a mobile client, the mobile client being one of the plurality of mobile clients and the registration information being registration information regarding the registration of the mobile client to the communication network, wherein
the geomessaging register node is configured to keep track of the geographical areas covered by each of the service enablers;
sending, to the identified service enabler, a contact information of said mobile client;
receiving, from the service enabler, a contact information of the service enabler;
sending, to the mobile client, said contact information of the service enabler;
handling geomessaging location updates coming from the mobile clients;
assigning the mobile client to the appropriate service enabler; and
in case of a location change, initiating a hand-over between service enablers.

8. A service enabler node for participating in providing a network service in a communication network covering a geographical area for a plurality of mobile clients, the service enabler node being configured for:
receiving, from a geomessaging register, a contact information of a mobile client, the mobile client being one of the plurality of mobile clients;
sending, to the geomessaging register, a contact information of the service enabler node;
participating in connecting the mobile client to the service enabler node for receiving the network service,
wherein
the service enabler node is further configured to address mobile clients in a designated geographical area; and
maintaining a list of the target areas, a target area being a service distribution area defined by an application server, and distribution areas, a distribution area being defined by tiles and its coordinates, which correspond to target areas.

9. A service enabler node for participating in providing a network service in a communication network covering a geographical area for a plurality of mobile clients, the service enabler node being configured for:
receiving, from a geomessaging register, a contact information of a mobile client, the mobile client being one of the plurality of mobile clients;
sending, to the geomessaging register, a contact information of the service enabler node;
participating in connecting the mobile client to the service enabler node for receiving the network service,
wherein the service enabler node is further configured to address mobile clients in a designated geographical area; and
maintaining a list of the identities of mobile clients inside any geographical area based on the mobile clients updating the service enabler node any time they leave their current geographical area and enter into a new area, and based on these mobile clients being updated with the coordinates of their current geographical area so they can send the location update message once they leave that area.

10. The service enabler node of claim 9, further configured for,
upon initiation from an application server, disseminating geocasted messages from the application server to concerned mobile clients in accordance with the locations requested by the application server.

* * * * *